US012539259B2

(12) United States Patent
Stern et al.

(10) Patent No.: US 12,539,259 B2
(45) Date of Patent: Feb. 3, 2026

(54) HYGIENE PRODUCT POD AND METHODS OF USING SAME

(71) Applicant: CMC Group, Inc., Bowling Green, OH (US)

(72) Inventors: Benjamin Gabriel Stern, Indiatlantic, FL (US); James J. Ramirez, Palm Bay, FL (US); Pablo Enrique Fernandez, Rockledge, FL (US)

(73) Assignee: CMC GROUP, INC., Bowling Green, OH (US)

( * ) Notice: Subject to any disclaimer, the term of this patent is extended or adjusted under 35 U.S.C. 154(b) by 678 days.

(21) Appl. No.: 17/736,456

(22) Filed: May 4, 2022

(65) Prior Publication Data

US 2023/0000728 A1 Jan. 5, 2023

Related U.S. Application Data

(63) Continuation of application No. PCT/US2020/059166, filed on Nov. 5, 2020, which is a continuation of application No. 16/675,990, filed on Nov. 6, 2019, now Pat. No. 11,045,397.

(51) Int. Cl.
A61K 8/02 (2006.01)
A61K 8/24 (2006.01)
A61K 8/34 (2006.01)
A61K 8/37 (2006.01)
A61K 8/41 (2006.01)
A61K 8/42 (2006.01)
A61K 8/81 (2006.01)
A61Q 5/02 (2006.01)
A61Q 5/12 (2006.01)

(52) U.S. Cl.
CPC ............ A61K 8/0204 (2013.01); A61K 8/24 (2013.01); A61K 8/345 (2013.01); A61K 8/375 (2013.01); A61K 8/41 (2013.01); A61K 8/42 (2013.01); A61K 8/8129 (2013.01); A61Q 5/02 (2013.01); A61Q 5/12 (2013.01); A61K 2800/596 (2013.01); A61K 2800/87 (2013.01)

(58) Field of Classification Search
CPC ........ A61K 8/0204; A61K 8/24; A61K 8/345; A61K 8/41; A61K 2800/596; A61K 2800/87; A61Q 5/02; A61Q 5/12
See application file for complete search history.

(56) References Cited

U.S. PATENT DOCUMENTS

| 3,081,267 | A | 3/1963 | Laskey |
| 4,436,789 | A | 3/1984 | Davis |
| 4,996,006 | A | 2/1991 | Constantine |
| 5,034,147 | A | 7/1991 | Ramachandran |
| 5,062,994 | A | 11/1991 | Imperatori |
| 5,456,863 | A | 10/1995 | Bergmann |
| 5,756,438 | A | 5/1998 | Rau |
| 5,824,629 | A | 10/1998 | Petritsch |
| 5,840,210 | A | 11/1998 | Memula |
| 5,916,635 | A | 6/1999 | Ishii |
| 5,951,991 | A | 9/1999 | Wagner |
| 5,990,058 | A | 11/1999 | Bac |
| 6,323,307 | B1 | 11/2001 | Bigg |
| 6,566,313 | B1 | 5/2003 | Hohenstein |
| 6,673,765 | B1 | 1/2004 | Schulz |
| 6,753,451 | B2 | 6/2004 | Nussbaum |
| 6,787,512 | B1 | 9/2004 | Verrall |
| 7,115,254 | B1 | 10/2006 | Brandt |
| 7,118,734 | B1 | 10/2006 | Fuchshuber |
| 8,367,048 | B2 | 2/2013 | Wells |
| 8,809,424 | B2 | 8/2014 | Feron |
| 9,393,447 | B2 | 7/2016 | Zasloff |
| 10,093,827 | B2 | 10/2018 | Wolbers |
| 10,314,935 | B2 | 6/2019 | Mcguire, Jr. |
| 2002/0155962 | A1 | 10/2002 | Cincotta |
| 2002/0198119 | A1 | 12/2002 | George |
| 2003/0054966 | A1 | 3/2003 | Bone |
| 2003/0162841 | A1 | 8/2003 | Pathak |
| 2003/0225472 | A1 | 12/2003 | Kato |
| 2004/0224863 | A1 | 11/2004 | Sun |
| 2005/0119151 | A1 | 6/2005 | Mayer |
| 2007/0275064 | A1 | 11/2007 | Mumoli |
| 2008/0145426 | A1 | 6/2008 | Amundson |
| 2008/0152711 | A1 | 6/2008 | Mumoli |
| 2009/0297569 | A1 | 12/2009 | Hurwitz |
| 2010/0313362 | A1 | 12/2010 | Vainshelboim |

(Continued)

FOREIGN PATENT DOCUMENTS

CN 1526009 A 9/2004
CN 105492588 A 4/2016

(Continued)

OTHER PUBLICATIONS

Clariant (Product Fact Sheet: Glucotain Plus, Jan. 2016.
Gloor et al., Forsch Komplementarmed Klass Naturheikd, 2002, vol. 9, No. 3, Abstract.
International Preliminary Report on Patentability for PCT/US16/42572 mailed Jan. 25, 2018.
International Search Report and Written Opinion for International Application No. PCT/US2016/042572 mailed Oct. 21, 2016.
International Search Report and Written Opinion for PCT/US2020/056130, mailed Feb. 8, 2021.

(Continued)

Primary Examiner — Zohreh A Fay
(74) Attorney, Agent, or Firm — Shumaker, Loop & Kendrick, LLP

(57) ABSTRACT

Disclosed herein are hygiene product pods and a method of using the hygiene product pods. A hygiene product pod can include a water-soluble envelope and a hygiene product sealed in the water-soluble envelope. A hygiene product as described herein can comprise a non-aqueous carrier. A non-aqueous carrier as described herein can comprise a polyol solvent and a polyglyceryl fatty acid ester (PGEs) chassis.

20 Claims, 11 Drawing Sheets

(56) References Cited

U.S. PATENT DOCUMENTS

| | | |
|---|---|---|
| 2010/0316586 A1 | 12/2010 | Knappe |
| 2011/0081392 A1 | 4/2011 | De Arruda |
| 2011/0188784 A1 | 8/2011 | Denome |
| 2012/0129955 A1 | 5/2012 | Bernhardt |
| 2013/0034515 A1 | 2/2013 | Stone |
| 2013/0090279 A1 | 4/2013 | Hilvert |
| 2016/0067155 A1 | 3/2016 | Shimada |
| 2016/0102279 A1 | 4/2016 | Labeque |
| 2016/0143833 A1 | 5/2016 | Jeong |
| 2016/0317397 A1 | 11/2016 | Wenz |
| 2017/0259975 A1 | 9/2017 | Yonezawa |
| 2017/0259976 A1 | 9/2017 | Lee |
| 2017/0298216 A1 | 10/2017 | Labeque |
| 2018/0000733 A1 | 1/2018 | Chakroborty |
| 2018/0086523 A1 | 3/2018 | Ades |
| 2018/0110699 A1 | 4/2018 | Conway |
| 2018/0110709 A1 | 4/2018 | Smyth |
| 2018/0311136 A1 | 11/2018 | Chang |
| 2019/0216698 A1 | 7/2019 | Stern |
| 2020/0199503 A1 | 6/2020 | Piorkowski |
| 2020/0277554 A1 | 9/2020 | Nelson |
| 2021/0196603 A1 | 7/2021 | Snyder |
| 2021/0275405 A1 | 9/2021 | Stern |
| 2023/0404878 A1 | 12/2023 | Stern |

FOREIGN PATENT DOCUMENTS

| | | | |
|---|---|---|---|
| EP | 0491076 | * | 12/1990 |
| EP | 0896052 A1 | | 2/1999 |
| EP | 1714678 B1 | | 10/2006 |
| EP | 1723944 A1 | | 11/2006 |
| JP | 2002053460 A | | 2/2002 |
| JP | 3935421 B2 | | 6/2004 |
| JP | 2009507916 A | | 2/2009 |
| JP | 2010059247 A | | 3/2010 |
| JP | 2012001597 A | | 1/2012 |
| JP | 2012144488 A | | 8/2012 |
| JP | 2013523627 A | | 6/2013 |
| JP | 2015013855 A | | 1/2015 |
| JP | 2016056148 A | | 4/2016 |
| KR | 101515851 B1 | | 5/2015 |
| KR | 1020140111903 | | 5/2015 |
| NL | 148102 | | 12/1975 |
| WO | 1985002858 A1 | | 7/1985 |
| WO | 9307245 A2 | | 4/1993 |
| WO | 199724428 A1 | | 7/1997 |
| WO | 0101954 A1 | | 1/2001 |
| WO | 2002022091 A2 | | 3/2002 |
| WO | 2004082655 A1 | | 1/2004 |
| WO | 2009153311 A2 | | 12/2009 |
| WO | 2011094690 A1 | | 8/2011 |
| WO | 2012055584 A2 | | 5/2012 |
| WO | 2014098268 A1 | | 6/2014 |
| WO | 2015097099 A1 | | 7/2015 |
| WO | 2017011774 A1 | | 1/2017 |
| WO | 2017180870 A1 | | 10/2017 |
| WO | 2019143809 A1 | | 7/2019 |
| WO | 2023173118 A2 | | 9/2023 |

OTHER PUBLICATIONS

International Search Report and Written Opinion for PCT/US2020/059166, mailed Feb. 8, 2021.

International Search Report and Written Opinion for PCT/US2019/014000, mailed Apr. 29, 2019.

Pazyar et al., "Oatmeal in Dermatology: A Brief Review", Indian Journal of Dermatology, Venereology and Leprology, Mar.-Apr. 2012; vol. 78(2): pp. 142-145.

Stepan, Personal Care Sulfate-Free, Jul. 2017.

Discover GlucoTain, GlucoTain, 2017, Clariant, pp. 1-25.

International Search Report and Written Opinion for PCT/US2023/064182, mailed Nov. 2, 2023.

Deacetis, Fashion Travel Essentials you Need for 2021, Forbes, 2021, p. 1-10, https://www.forbes.com/sites/Josephdeacetis/2021/08/20/fashion-travel-essentials-you-need-for-2021/?sh=473eea9d37de.

Handbook of Cosmetic Preparation for Skin Beauty, downloaded Feb. 28, 2023.

International Search Report and Written Opinion for PCT/US2022/074986, mailed Jan. 18, 2023.

Liu, Zhongdong, Principles and Application Technology of Food Additives, China Light Industry, p. 39.

Neale, 'Shark Tank' shampoo entrepreneur from Viera High guiding Nohbo to new heights, Florida Today, 2020, p. 1-4, downloaded Mar. 17, 2023, https://www.floridatoday.com/story/news/2020/01/10/shark-tank-inventor-viera-high-gets-visit-mark-cuban/4305917002.

Nichol, Luxe Pack La & MakeUp in LA:Monodose packaging's sustainable evolution, Luxe Pack LA & MakeUp in LA; 2022, p. 1-6, downloaded Mar. 17, 2023, https://www.luxepackaginginsight.com/article/luxe-pack-la-makeup-in-la-monodose-packaging-s-sustainable-evolution.60347.

Nohbo, 'Shark Tank' Alum Nohbo Raises $3M Series Seed Led By Material Impact, 2020, p. 1-3, downloaded Mar. 17, 2023.

Plastic Generation, Young entrepreneur aims to remove plastic bottles forever!—Plastic Generation, p. 1-10, downloaded Mar. 17, 2023, https://plasticgeneration.com/young-entrepreneur-aims-to-remove-plastic-bottles-forever/.

Rolling Stone, How this Disruptive Startup Eliminates Plastics Outright from Bathroom, 2022, p. 1-19, downloaded Mar. 17, 2023, https://www.rollingstone.com/culture/culture-news/how-this-disruptive-startup-eliminates-plastics-butright-from-your-daily-routine-1335995/.

Safety Data Sheet, Colonial Chemical, 2022, Revision No. 1, p. 1-10.

* cited by examiner

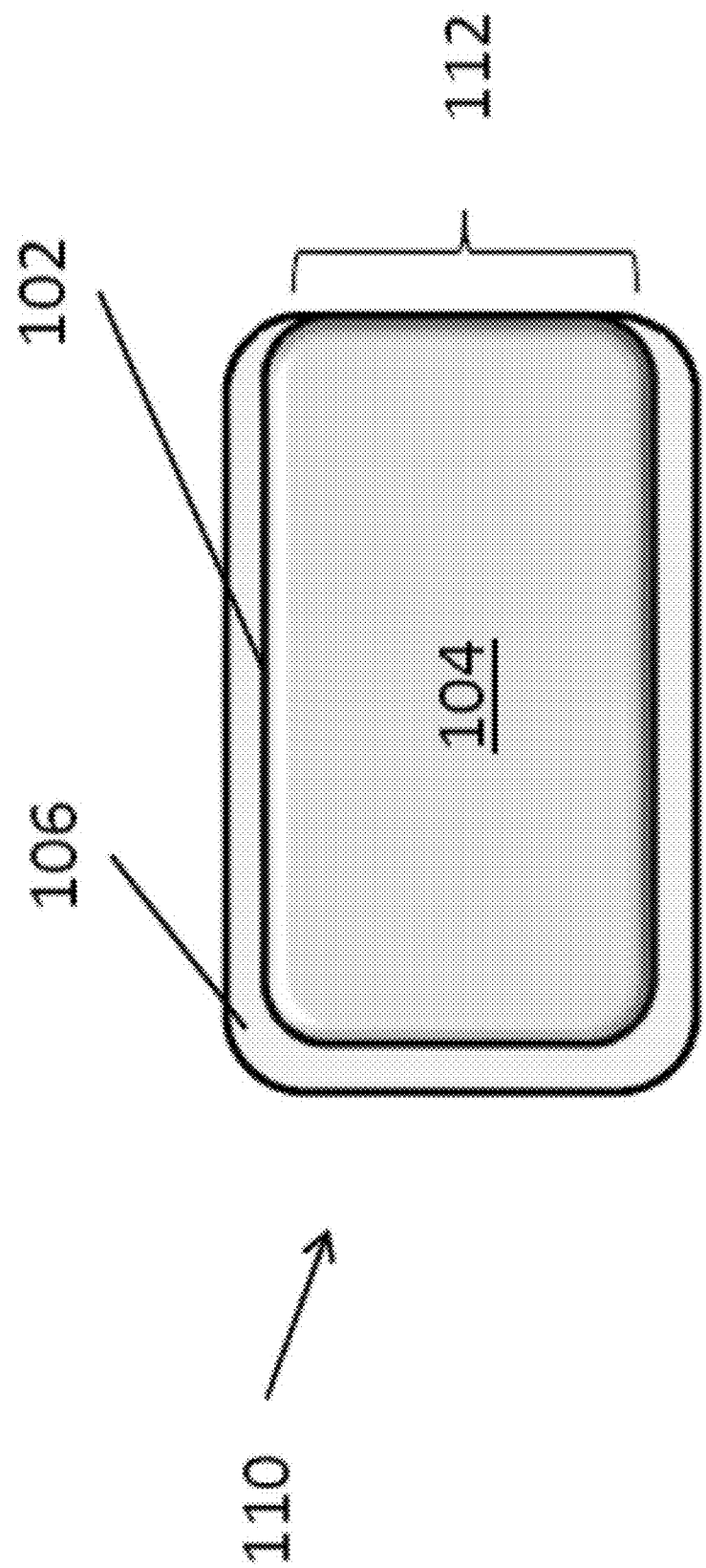

HYGIENE PRODUCT POD AND METHODS OF USING SAME

CROSS-REFERENCE

This application is a bypass continuation of PCT Application No. PCT/US2020/059166, filed Nov. 5, 2020, which claims priority to U.S. patent application Ser. No. 16/675,990, filed Nov. 6, 2019, now U.S. Pat. No. 11,045,397 B2, issued Jun. 29, 2021, entitled "Hygiene Product Pod and Methods of Using Same, each of which are incorporated herein by reference in their entirety.

BACKGROUND

Hygiene products, such as shampoo, bodywash, lotion, shaving cream, and conditioner, are typically manufactured in a liquid or gel format in order to provide the user with an easily dispensable and spreadable product. Such hygiene products generally contain active agents, such as surfactants and/or conditioners, in addition to significant amounts of water and/or viscosity control agents and are most commonly provided in large bottles containing enough product for multiple applications. While such bulk products are suitable for many consumer applications, there remains a need for smaller aliquots of hygiene products, particularly in the travel and hospitality industries.

Hygiene products have been provided in small bottles for use in the hospitality and/or travel industries. These bottles provide a user with enough product for one or a few uses, but generally are not meant for long-term use and are meant to be disposed of in a few short days. Unfortunately, in at least some instances, the small bottles of hygiene product (e.g., shampoo, conditioner, lotion, shaving cream, bodywash, etc.) generally found in the hospitality industry have a high packaging to product ratio, and are typically made of non-reusable and/or non-biodegradable materials, which contributes to higher costs and excessive amounts of waste.

Some single-use packages of hygiene product (e.g., shampoo, conditioner) have been developed to reduce the packaging to product ration and cut down on waste. However, in at least some instances, these packages are packaged in plastic sachets, bags, or blister packs which are generally not recycled or biodegradable and therefore continue to produce undesirable amounts of waste.

SUMMARY

It would therefore be desirable to provide single-use devices, systems, and methods which are eco-friendly, reduce waste, and provide measured doses of hygiene product. Not necessarily all such aspects or advantages are achieved by any particular embodiment. Thus, various embodiments may be carried out in a manner that achieves or optimizes one advantage or group of advantages taught herein without necessarily achieving other aspects or advantages as may also be taught or suggested herein.

The present disclosure generally relates to single-use cleaning and/or personal care products and more particularly relates to single-use water-soluble hygiene product pods.

Aspects of the present disclosure provide a hygiene product pod configured for single-use applications, and a method of using such a pod.

Disclosed herein are hygiene product pods, comprising: a water-soluble envelope; and a hygiene product sealed in the water-soluble envelope, the hygiene product comprising, based on the total weight of the hygiene product: a non-aqueous carrier comprising: one or more polyol solvents in an amount ranging from about 10 wt % to about 30 wt %; and one or more polyglyceryl fatty acid ester (PGE) chassis in an amount ranging from about 10 wt % to about 50 wt %, wherein the hygiene product has a free water content of about 18 wt % or less. In some embodiments, the hygiene product is an emulsified liquid or gel. In some embodiments, the hygiene product is an emulsified liquid. In some embodiments, the hygiene product comprises, based on the total weight of the hygiene product, one or more primary surfactants in an amount ranging from about 10 wt % to about 40 wt %. In some embodiments, the hygiene product comprises, based on the total weight of the hygiene product, the one or more primary surfactants in an amount ranging from about 20 wt % to about 35 wt %. In some embodiments, the one or more primary surfactants are selected from non-ionic surfactants, anionic surfactants, amphoteric surfactants, cationic surfactants, or a combination thereof. In some embodiments, the hygiene product comprises, based on the total weight of the hygiene product, the one or more polyol solvents in an amount ranging from about 15 wt % to about 25 wt %. In some embodiments, the hygiene product further comprises a fragrance oil. In some embodiments, the hygiene product further comprises a pyrrolidone compound in an amount ranging from about 0.5 wt % to about 10 wt %. In some embodiments, the pyrrolidone compound is lauryl pyrrolidone. In some embodiments, the pyrrolidone compound is caprylyl pyrrolidone. In some embodiments, the one or more polyol solvents comprise, based on the total weight of the hygiene product: propylene glycol in an amount ranging from about 10 wt % to about 25 wt %; glycerin in an amount ranging from about 1 wt % to about 10 wt %; di-propylene glycol in an amount ranging from about 0 wt % to about 10 wt %; and hexylene glycol in an amount ranging from about 0 wt % to about 5 wt %. In some embodiments, the hygiene product comprises, based on the total weight of the hygiene product, the one or more PGE chassis in an amount ranging from about 12 wt % to about 50 wt %. In some embodiments, the one or more PGE chassis have a hydrophilic-lipophilic balance (HLB) value of at least 9. In some embodiments, the one or more PGE chassis have a hydrophilic-lipophilic balance (HLB) value of about 13. In some embodiments, the one or more PGE chassis comprise, based on the total weight of the hygiene product: polyglyceryl-6 esters in an amount ranging from about 0.5 wt % to about 11 wt %; and polyglyceryl-2 caprate in an amount ranging from about 5 wt % to about 35 wt %. In some embodiments, the one or more PGE chassis comprise, based on the total weight of the hygiene product: polyglyceryl-2 caprate in an amount ranging from about 10 wt % to about 50 wt %. In some embodiments, the non-aqueous carrier comprises, based on the total weight of the hygiene product, liquid amides in an amount ranging from about 5 wt % to about 40 wt %. In some embodiments, the non-aqueous carrier comprises, based on the total weight of the hygiene product, the liquid amides in an amount ranging from about 6 wt % to about 20 wt %. In some embodiments, the liquid amides comprise, based on the total weight of the hygiene product: lactamide monoethanolamine (LMEA) in an amount ranging from about 1 wt % to about 15 wt %; and dimethyl lauramide/myristamide in an amount ranging from about 1 wt % to about 15 wt %. In some embodiments, the non-aqueous carrier comprises, based on the total weight of the hygiene product, phospholipids in an amount ranging from about 0 wt % to about 20 wt %. In some embodiments, the non-aqueous carrier comprises, based on the total weight of the hygiene product, the phospholipids in an amount ranging from about 1 wt % to about 15 wt %. In some embodiments, the phospholipids comprise cocamidopropyl PG-dimonium chloride phosphate and linoleamidopropyl PG-dimonium chloride phosphate. In some embodiments, the water-soluble envelope comprises polyvinyl alcohol (PVOH) or hydroxypropyl methylcellulose (HPMC). In some embodiments, the water-soluble envelope comprises a polyvinyl alcohol (PVOH) film or a woven or non-woven polyvinyl alcohol (PVOH) fiber. In some embodiments, the water-soluble envelope has a thickness ranging from about 0.5 mil to about 10 mil. In some embodiments, the free water content is about 13 wt % or less, based on the total weight of the hygiene product. In some embodiments, the free water content is from about 1% to about 12.5%. In some embodiments, the hygiene product has a water activity of 0.70 aw or less. In some embodiments, the hygiene product is a shampoo, a conditioner, a body wash, or a combination thereof. In some embodiments, the hygiene product is a shaving cream. In some embodiments, the hygiene product is a lotion.

Also disclosed herein are methods of using the hygiene product pod as described herein, comprising: applying water to the pod to dissolve the water-soluble envelope and release the hygiene product; applying the hygiene product to at least one body part of a user; and rinsing the hygiene product from the body part. In some embodiments, applying water comprises applying the water for a time period ranging from about 5 seconds to about 60 seconds to dissolve the water-soluble envelope. In some embodiments, applying water comprises applying the water for a time period ranging from about 15 seconds to about 45 seconds to dissolve the water-soluble envelope.

These and other embodiments are described in further detail in the following description related to the appended drawing figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2 shows a top plan view of a hygiene product pod, in accordance with embodiments;

DETAILED DESCRIPTION

Figure 1A:
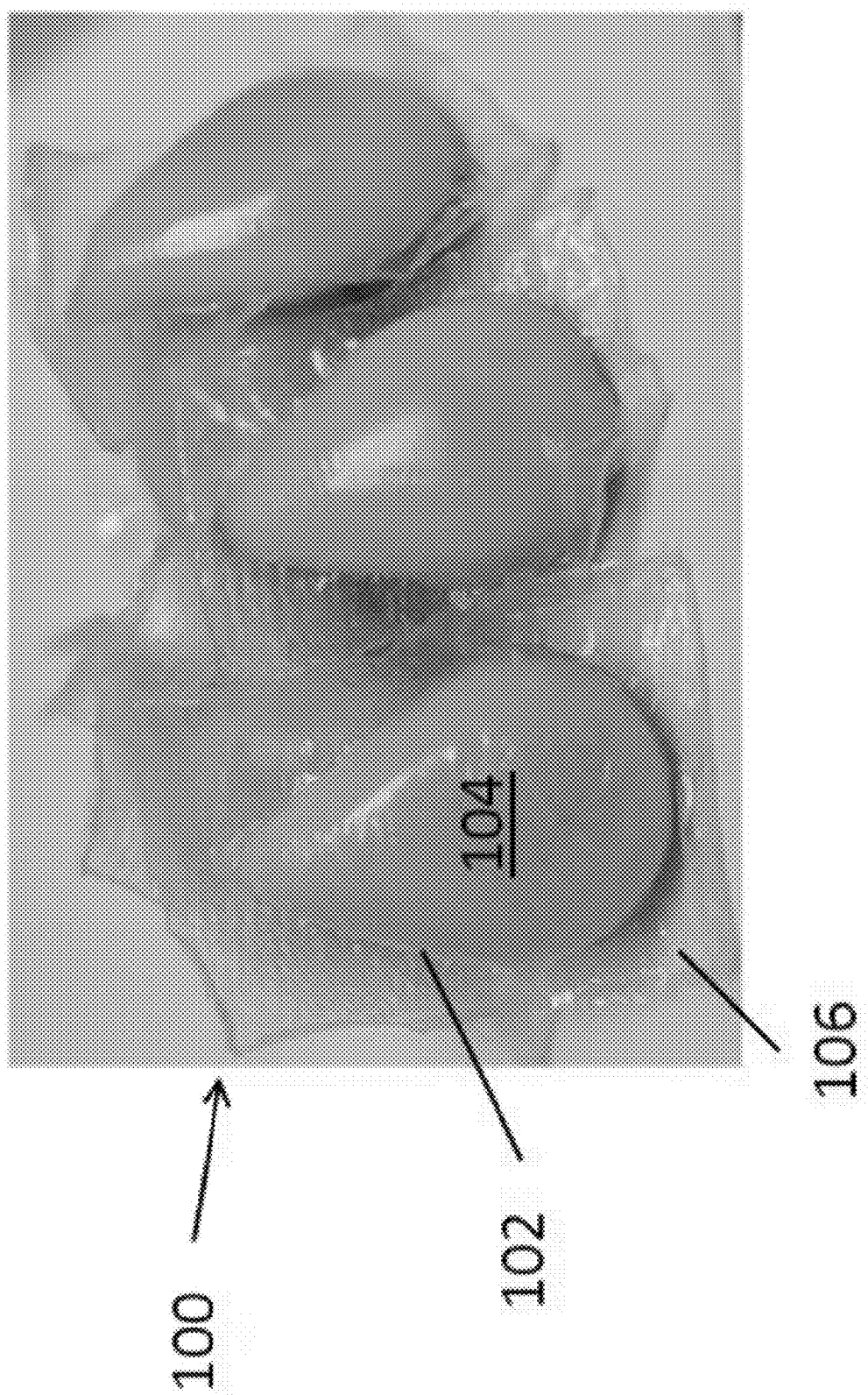
FIG. 1A shows a photograph of a hygiene product pod, in accordance with embodiments.

In the following detailed description, reference is made to the accompanying figures, which form a part hereof. The drawings illustrate embodiments of the present disclosure and, together with the detailed description, serve to explain the principles of the present disclosure. The drawings may not necessarily be in scale so as to better present certain features of the illustrated subject matter. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments, however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

The present disclosure is described in relation to hygiene products (including shampoo, conditioner, bodywash, soap, shaving cream, lotion, etc.). However, one of skill in the art will appreciate that this is not intended to be limiting and the devices and methods disclosed herein may be used in other cleaning and/or personal care products. For example, the devices and methods disclosed herein may be used to provide single-use water soluble laundry detergents, bleach, laundry additives (e.g., softener), fabric care products, dishwashing detergents, surface cleaning products, beauty care products, skin care products (e.g., lotions), toothpastes, etc.

For convenience in explanation and accurate definition in the appended claims, the terms "up" or "upper", "down" or "lower", "inside" and "outside" are used to describe features of the present disclosure with reference to the positions of such features as displayed in the figures.

In many respects the modifications of the various figures resemble those of preceding modifications and the same reference numerals followed by subscripts "a", "b", "c", and "d" designate corresponding parts. It will be understood by one of ordinary skill in the art that modifications of corresponding parts of the various figures are interchangeable with one another between embodiments to arrive at multiple combinations with multiple modified parts.

The word "exemplary" is used herein to mean "serving as an example, instance, or illustration." Any implementation described herein as "exemplary" is not necessarily to be construed as preferred or advantageous over other implementations.

Terminology used herein is for the purpose of describing particular embodiments only and is not intended to be limiting of the present disclosure. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Various embodiments described herein relate to hygiene product pods in which the hygiene product is encapsulated in a water-soluble envelope in a single-use format. In some embodiments, the hygiene product pods may provide cleansing and/or conditioning agents for hair and/or skin. In particular, the hygiene product may include an active agent(s), such as active ingredients of a shampoo, conditioner, or a combination thereof, within a non-aqueous carrier agent(s) that may comprise one or more polyols, which can include one or more polyglyceryls.

The component weight percentages disclosed herein are based on the total weight of the hygiene product, unless otherwise specified.

Hygiene Product Pods

Various embodiments described herein may include a single dose of a hygiene product in the form of a pod. As used herein, the term "pod" refers to water-soluble material filled with a hygiene product and sealed to form a chamber (also referred to herein as an envelope) in the shape of a capsule, sphere, drop, or the like. For example, a pod may include a water-soluble envelope encapsulating a liquid or gel hygiene product. In some embodiments, a pod may include a water-soluble envelope encapsulating a solid or a paste hygiene product.

A pod may have any suitable shape and/or size as desired by one of ordinary skill in the art. For example, the water-soluble material may be sealed around the hygiene product to form a shaped chamber holding the hygiene product. In some embodiments, the chamber may be relatively flat (e.g., with a relatively small thickness compared to its width and length) such that the pod appears nearly two-dimensional. In some embodiments, the chamber may be three-dimensional. The chamber (and thus the pod as a whole) may be shaped like a capsule, a sphere, a drop, a cylinder, a cone, an ellipsoid, a tetrahedron, a square pyramid, a hexagonal pyramid, a cube, a cuboid, a triangular prism, an octahedron, a pentagonal prism, a hexagonal prism, a dodecahedron, an icosahedron, or the like, or a nearly two-dimensional version (e.g., rectangular, circular, triangular, square, pentagonal, circular, elliptical, tablet-shaped, or the like) thereof.

In some embodiments, a pod may contain a sufficient amount of hygiene product for a single use (also referred to herein as a single dose). For example, a pod may contain an amount of shampoo sufficient to clean one head of hair. In some embodiments, a pod may contain an amount of conditioner sufficient to condition one head of hair. In some embodiments, a pod may contain an amount of bodywash sufficient to wash one body. In some embodiments, a pod may contain an amount of a shaving product sufficient to shave one or more body parts. As used herein, the term "shaving product" may refer to shaving cream, shaving gel, or a precursor composition configured to form a shaving product. It will be understood by one of ordinary skill in the art that the volume of a single dose of the hygiene product may depend on the nature of the hygiene product itself. For example, a user may require a smaller volume of a more concentrated hygiene product and a larger volume of a more dilute hygiene product in order to achieve the same effect. Alternatively, or in combination, the type of hygiene product may determine the volume of a single dose thereof. For example, a single dose of a shampoo may be about the same as a single dose of a conditioner. A single dose of a bodywash may be larger than a single dose of a shampoo if the bodywash is less viscous than the shampoo and/or if the tissue surface area to be cleansed is sufficiently larger. Pods including a concentrated active agent may be smaller than pods containing undiluted or semi-diluted active agents.

The pod may have a weight within a range of about 1 g to about 20 g. For example, the pod may have a weight within a range bounded by any two of the following values: 1 g, 2 g, 3 g, 4 g, 5 g, 6 g, 7 g, 8 g, 9 g, 10 g, 11 g, 12 g, 13 g, 14 g, 15 g, 16 g, 17 g, 18 g, 19 g, or 20 g. In some embodiments, for example when the hygiene product is a shampoo, conditioner, or shampoo and conditioner two-in-one, the pod may range in weight from about 4 g to about 12 g, such as from about 5 g to about 8 g. In some embodiments, for example when the hygiene product is a bodywash, the pod may range in weight from about 5 g to about 15 g, such as from about 8 g to about 10 g.

The pod may have a volume within a range of about 4 ml to about 10 ml. For example, the pod may have a volume within a range bounded by any two of the following values: 4 ml, 5 ml, 6 ml, 7 ml, 8 ml, 9 ml, or 10 ml. In some embodiments, for example when the hygiene product is a shampoo or bodywash, the pod may range in volume from about 4 ml to about 7 ml, such as about 5 ml. In some embodiments, for example when the hygiene product is a conditioner, the pod may range in volume from about 6 ml to about 8 ml, such as about 7 ml.

FIG. 1A shows a photograph of a plurality of hygiene product pods 100. The pod 100 may comprise a hygiene product 104 sealed in a water-soluble envelope 102. The water-soluble envelope 102 may be sealed around the hygiene product 104 to form a hygiene product 104 filled chamber. The chamber (and thus the overall impression of the pod 100) may be generally drop-shaped (as shown). However, the chamber/pod is not limited to any particular shape. For example, the chamber/pod may be rectangular, circular, triangular, square, pentagonal, circular, elliptical, tablet-shaped, or the like.

The water-soluble envelope 102 may be configured to rapidly dissolve in the presence of a solvent such as water. For example, the water-soluble envelope 102 may include, or be formed of, a water-soluble material such as polyvinyl alcohol (PVOH or PVA), carboxymethyl cellulose (CMC), hydroxypropyl methylcellulose (HPMC), or the like. The water-soluble material may be in the form of a film, a woven fiber, or non-woven fiber. For example, the water-soluble material may comprise a PVOH fiber, CMC fiber, or the like. For example, the water-soluble envelope 102 may be formed of a PVOH film, such as Monosol 9643 or Monosol PC2600, available from Kuraray Inc.

The solubility of the water-soluble envelope 102 may depend on the material from which it is formed. For example, the degree of hydrolysis of PVOH may affect the water-solubility of the water-soluble envelope 102, with less hydrolyzed PVOH being more water-soluble at lower temperatures and more hydrolyzed PVOH being less water-soluble at lower temperatures and requiring higher temperature water for similar solubility rates. Further, the molecular weight of the polymer used may affect the water-solubility. For example, a lower molecular weight polymer may dissolve faster than a higher molecular weight polymer in water. Alternatively, or in combination, the thickness and/or pH of the material may affect the solubility of the water-soluble envelope 102. Alternatively, or in combination, the temperature of the water may affect the solubility of the water-soluble envelope 102.

The water-soluble envelope 102 may have a thickness ranging from about 0.5 mil to about 200 mil, from about 0.5 mil to about 190 mil, from about 0.5 mil to about 180 mil, from about 0.5 mil to about 170 mil, from about 0.5 mil to about 160 mil, from about 0.5 mil to about 150 mil, from about 0.5 mil to about 140 mil, from about 0.5 mil to about 130 mil, from about 0.5 mil to about 120 mil, from about 0.5 mil to about 110 mil, from about 0.5 mil to about 100 mil, from about 0.5 mil to about 90 mil, from about 0.5 mil to about 80 mil, from about 0.5 mil to about 70 mil, from about 0.5 mil to about 60 mil, from about 0.5 mil to about 50 mil, from about 0.5 mil to about 40 mil, from about 0.5 mil to about 30 mil, from about 0.5 mil to about 20 mil, from about 0.5 mil to about 10 mil, from about 0.5 mil to about 9 mil, from about 0.5 mil to about 8 mil, from about 0.5 mil to about 7 mil, from about 0.5 mil to about 6 mil, from about 0.5 mil to about 5 mil, from about 0.5 mil to about 4 mil, from about 0.5 mil to about 3 mil, from about 0.5 mil to about 2 mil, or from about 0.5 mil to about 1 mil. For example, the water-soluble envelope 102 may have a thickness within a range bounded by any two of the following values: 0.5 mil, 1 mil, 1.5 mil, 2 mil, 2.5 mil, 3 mil, 3.5 mil, 4 mil, 4.5 mil, 5 mil, 5.5 mil, 6 mil, 6.5 mil, 7 mil, 7.5 mil, 8 mil, 8.5 mil, 9 mil, 9.5 mil, 10 mil, 11 mil, 12 mil, 13 mil, 14 mil, 15 mil, 16 mil, 17 mil, 18 mil, 19 mil, 20 mil, 25 mil, 30 mil, 35 mil, 40 mil, 45 mil, 50 mil, 55 mil, 60 mil, 65 mil, 70 mil, 75 mil, 80 mil, 85 mil, 90 mil, 95 mil, 100 mil, 105 mil, 110 mil, 115 mil, 120 mil, 125 mil, 130 mil, 135 mil, 140 mil, 145 mil, 150 mil, 155 mil, 160 mil, 165 mil, 170 mil, 175 mil, 180 mil, 185 mil, 190 mil, 195 mil, or 200 mil.

The water-soluble envelope 102 may have a pH ranging from about 4.0 to about 9.0, at a temperature of about 25° C. For example, the water-soluble envelope 102 may have a pH at about 25° C. within a range bounded by any two of the following values: 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, or 9.0

The water-soluble envelope 102 may be configured to rapidly dissolve in water at about 25° C. within about 0.5 seconds to about 1 minute. For example, the water-soluble envelope 102 may be configured to dissolve in water at about 25° C. in a time period ranging from about 3 seconds to about 15 seconds, such as from about 5 seconds to about 7 seconds. The water-soluble envelope 102 may be configured to dissolve in 25° C. water within about 5 seconds to about 60 seconds, such as about 15 seconds to about 45 seconds or about 20 seconds to about 30 seconds. The water-soluble envelope 102 may be configured to dissolve in 25° C. water within a time range bounded by any two of the following values: 0.5 seconds, 1 second, 2 seconds, 3 seconds, 4 seconds, 5 seconds, 6 seconds, 7 seconds, 8 seconds, 9 seconds, 10 seconds, 11 seconds, 12 seconds, 13 seconds, 14 seconds, 15 seconds, 16 seconds, 17 seconds, 18 seconds, 19 seconds, 20 seconds, 21 seconds, 22 seconds, 23 seconds, 24 seconds, 25 seconds, 26 seconds, 27 seconds, 28 seconds, 29 seconds, 30 seconds, 31 seconds, 32 seconds, 33 seconds, 34 seconds, 35 seconds, 36 seconds, 37 seconds, 38 seconds, 39 seconds, 40 seconds, 41 seconds, 42 seconds, 43 seconds, 44 seconds, 45 seconds, 46 seconds, 47 seconds, 48 seconds, 49 seconds, 50 seconds, 51 seconds, 52 seconds, 53 seconds, 54 seconds, 55 seconds, 56 seconds, 57 seconds, 58 seconds, 59 seconds, or 60 seconds.

It has been found that forming the water-soluble envelope 102 of PVOH may be particularly beneficial. For example, dissolved PVOH may act as a film-former (e.g., a conditioning agent) and/or a foam-boosting agent. Accordingly, a PVOH water-soluble envelope 102 may unexpectedly improve the properties of the hygiene product 104 by adding to suds, bubbles, and/or foam when in use.

The hygiene product pod 100 may be formed by sealing two or more sheets or layers of the water-soluble material around the hygiene product 104. For example, the water-soluble envelope 102 may be formed by placing the hygiene product 104 between two sheets of the water-soluble material, and then sealing the perimeters of the two sheets so as to form a seal region 106 that extends around the entire perimeter of the hygiene product pod 100. In some embodiments, the sheets may be partially sealed (e.g., sealed along three sides) to form the water-soluble envelope 102, after which the hygiene product 104 may be inserted into an open end of the water-soluble envelope 102. The open end may then be sealed to complete the formation of the hygiene product pod 100.

Alternatively, or in combination, the hygiene product pod 100 may be formed by folding a single sheet or layer of the water-soluble material around the hygiene product 104. For example, the water-soluble envelope 102 may be formed by folding a sheet or layer of the water-soluble material over on itself to form two layers and partially-sealing the perimeter of the sheets so as to form a seal region 106 as described herein.

Alternatively, or in combination, the hygiene product pod 100 may be formed by folding a single sheet or layer of the water-soluble material around the hygiene product 104. For example, the water-soluble envelope 102 may be formed by folding a sheet or layer of the water-soluble material over on itself to form two layers and sealing the perimeter of the sheets so as to form a seal region 106 as described herein.

In various embodiments, sealing may be accomplished using any suitable sealing method. In some embodiments, the water-soluble material may be sealed using a heat sealing method. In some embodiments, sealing may include the use of a water-soluble adhesive. In some embodiments, hygiene product pods 100 may be formed using a packing machine, such as a Hydroforma packaging machine manufactured by Cloud Packaging Solutions, Des Plaines, IL.

Figure 1B:
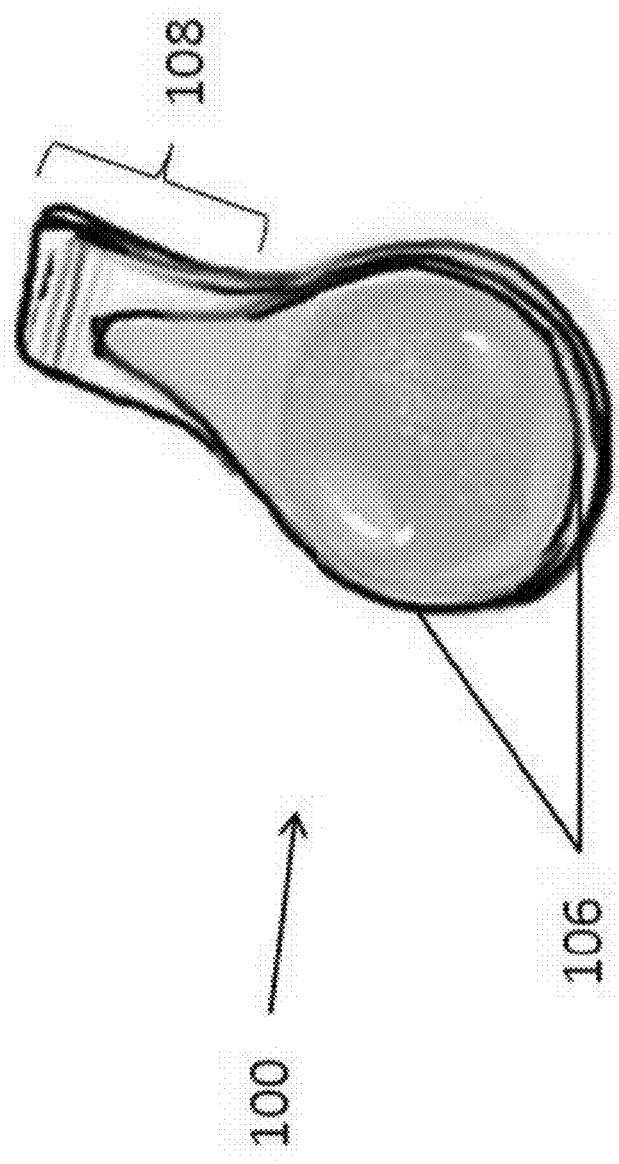
FIG. 1B shows a perspective front view of a hygiene product pod following an optional cutting process, in accordance with embodiments.
Figure 1C:
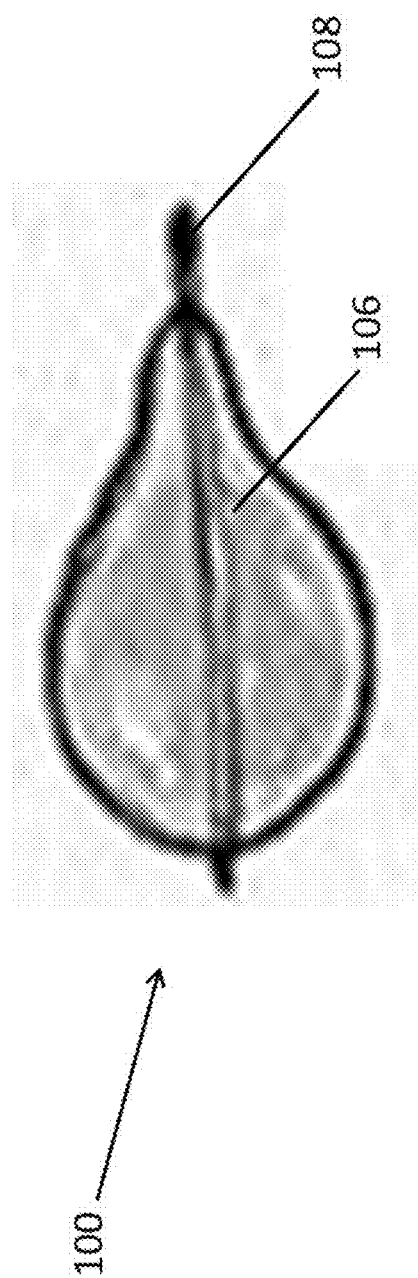
FIG. 1C shows a side view of the hygiene product pod of FIG. 1B, in accordance with embodiments.

FIG. 1B shows a perspective front view of a hygiene product pod 100 following an optional trimming process. FIG. 1C shows a side view of the hygiene product pod 100 of FIG. 1B. In some embodiments, at least a portion of the seal region 106 may be optionally removed from the hygiene product pod 100, for example to form a tab 108. For example, the water-soluble envelope 102 may be cut during manufacturing of the hygiene product pod 100. The tab 108 may operate as a contact point to facilitate handling of the hygiene product pod 100 and/or removal of the hygiene product pod 100 from product container or packaging.

Figure 1E:
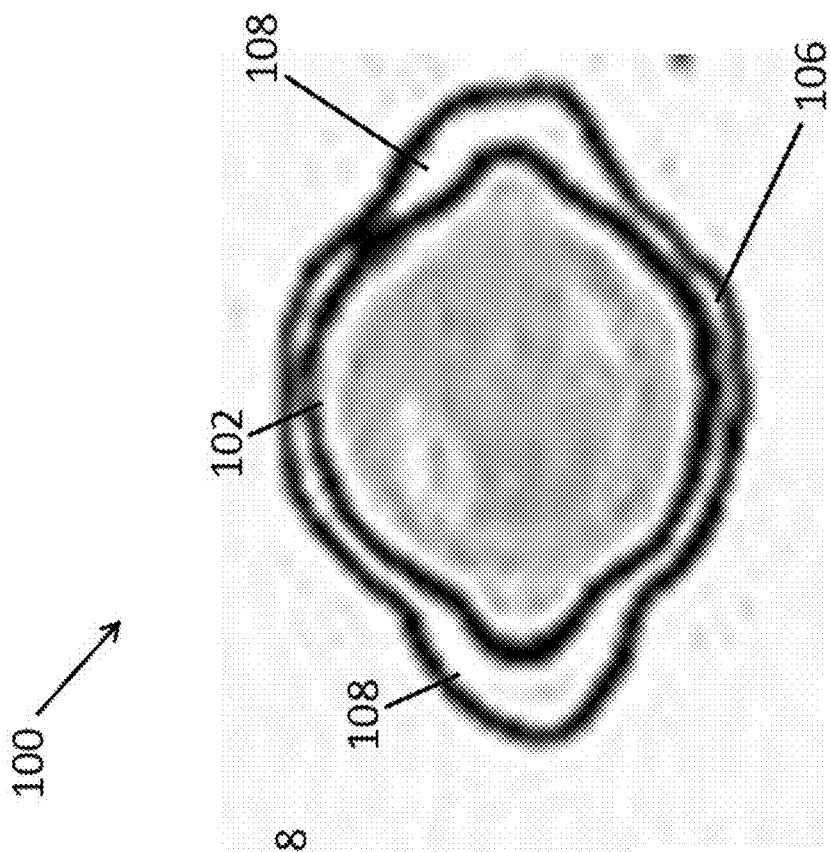
FIG. 1E shows a top view of the hygiene product pod of FIG. 1D, in accordance with embodiments.
Figure 1D:
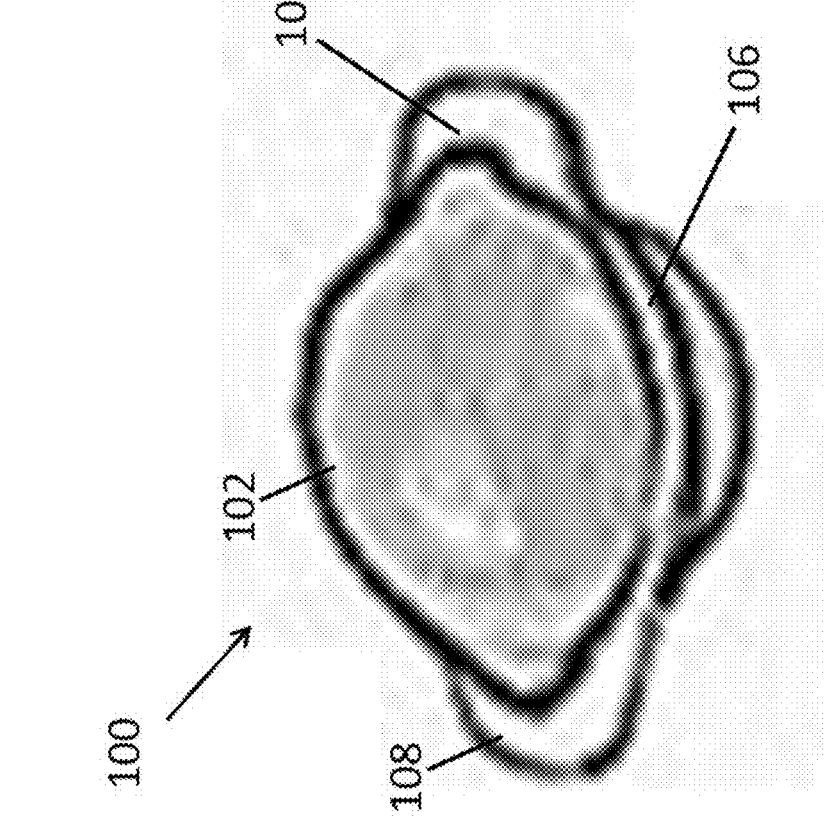
FIG. 1D shows a perspective front view of a hygiene product pod, in accordance with embodiments.

FIG. 1D shows a perspective front view of a hygiene product pod 100. FIG. 1E shows a top view of the hygiene product pod of FIG. 1D. As described herein, the hygiene product pod 100 may comprise a hygiene product 104 sealed in a water-soluble envelope 102. The water-soluble envelope 102 may be sealed around the hygiene product 104 to form a hygiene product 104 filled chamber. In some embodiments, at least a portion of the seal region 106 may be optionally removed from the hygiene product pod 100, for example to form tabs 108. In some embodiments, the chamber (and thus the overall impression of the pod 100) may be generally spherical-shaped or planetoid shaped (as shown). The hygiene product pod 100 may comprise one or more tabs 108, for example two tabs 108 on opposite ends of the seal region 106.

Figures 1F, 1G:
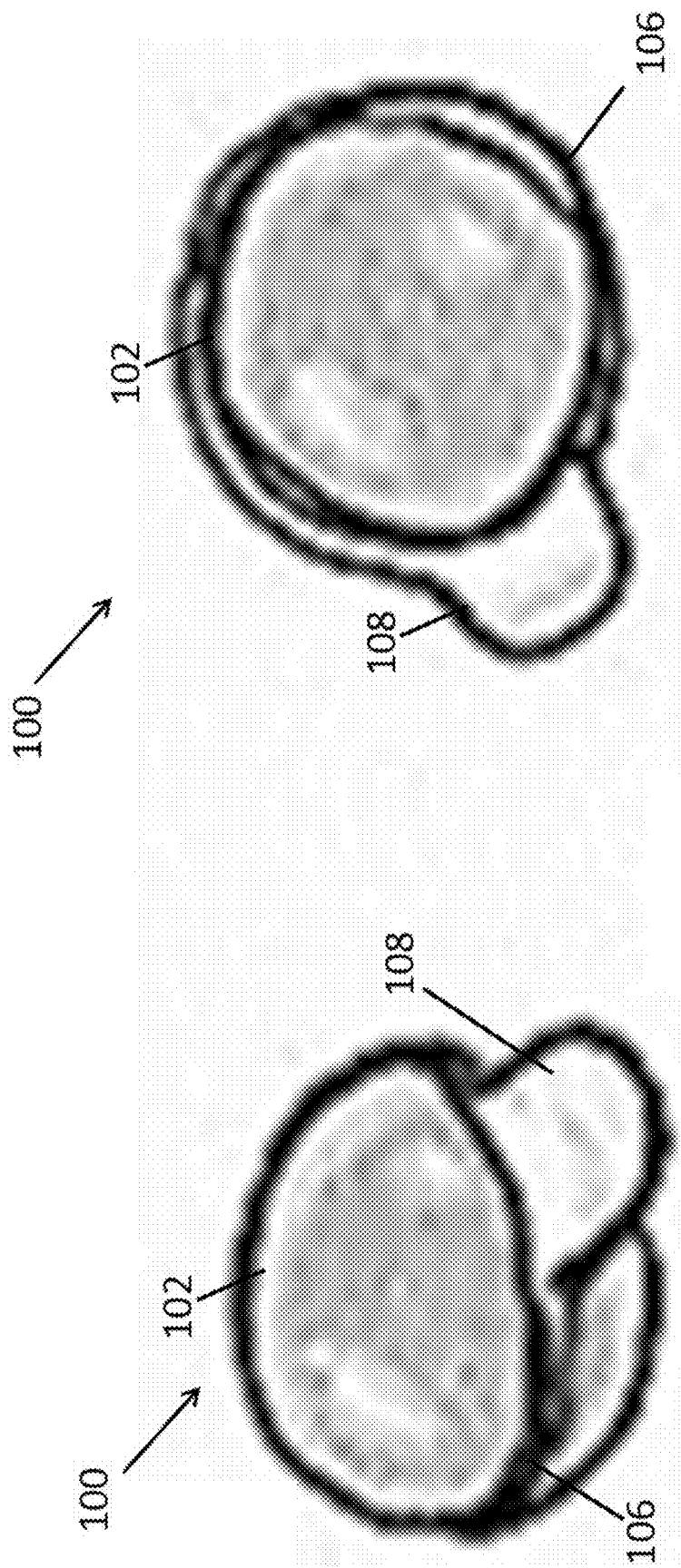
FIG. 1F shows a perspective front view of a hygiene product pod, in accordance with embodiments.
FIG. 1G shows a top view of the hygiene product pod of FIG. 1F, in accordance with embodiments.

FIG. 1F shows a perspective front view of a hygiene product pod 100. FIG. 1G shows a top view of the hygiene product pod 100 of FIG. 1F. As described herein, the hygiene product pod 100 may comprise a hygiene product 104 sealed in a water-soluble envelope 102. The water-soluble envelope 102 may be sealed around the hygiene product 104 to form a hygiene product 104 filled chamber. In some embodiments, at least a portion of the seal region 106 may be optionally removed from the hygiene product pod 100, for example to form tab 108. In some embodiments, the chamber (and thus the overall impression of the pod 100) may be generally spherical-shaped (as shown).

Figure 1I:
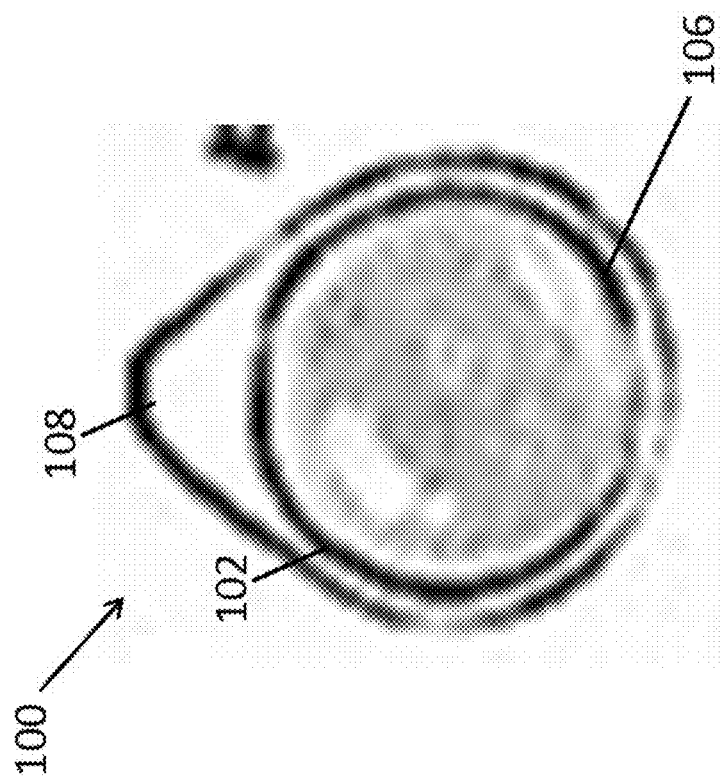
FIG. 1I shows a perspective front view of a hygiene product pod, in accordance with embodiments.
Figure 1H:
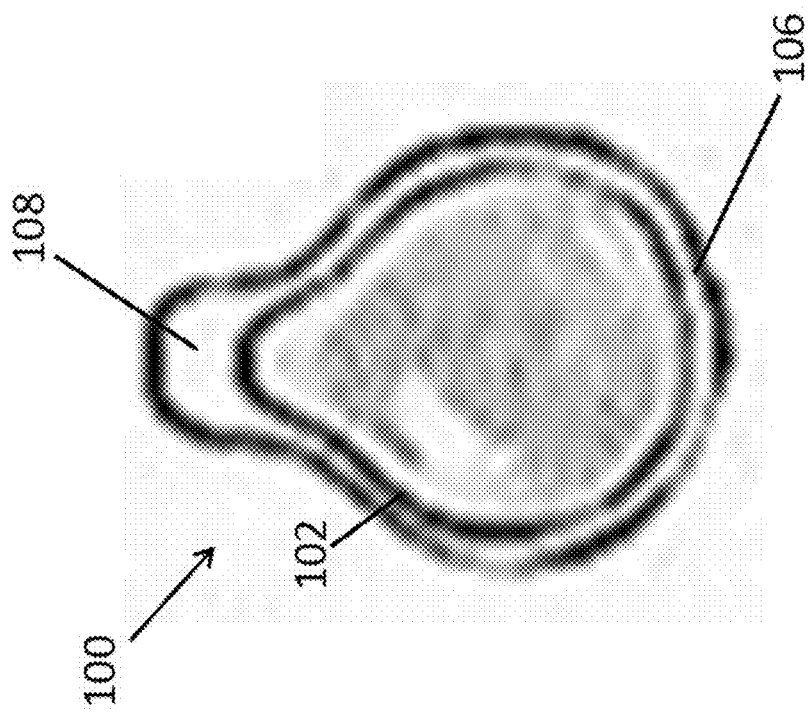
FIG. 1H shows a perspective front view of a hygiene product pod, in accordance with embodiments.

FIG. 1H shows a perspective front view of a hygiene product pod 100. As described herein, the hygiene product pod 100 may comprise a hygiene product 104 sealed in a water-soluble envelope 102. The water-soluble envelope 102 may be sealed around the hygiene product 104 to form a hygiene product 104 filled chamber. In some embodiments, at least a portion of the seal region 106 may be optionally removed from the hygiene product pod 100, for example to form tab 108. In some embodiments, the chamber (and thus the overall impression of the pod 100) may be generally drop-shaped (as shown).

FIG. 1I shows a perspective front view of a hygiene product pod 100. As described herein, the hygiene product pod 100 may comprise a hygiene product 104 sealed in a water-soluble envelope 102. The water-soluble envelope 102 may be sealed around the hygiene product 104 to form a hygiene product 104 filled chamber. In some embodiments, at least a portion of the seal region 106 may be optionally removed from the hygiene product pod 100, for example to form tab 108. In some embodiments, the chamber may be generally spherical-shaped (as shown) and the tab 108 may be tapered such that the overall impression of the pod 100 is roughly drop shaped.

Figure 1J:
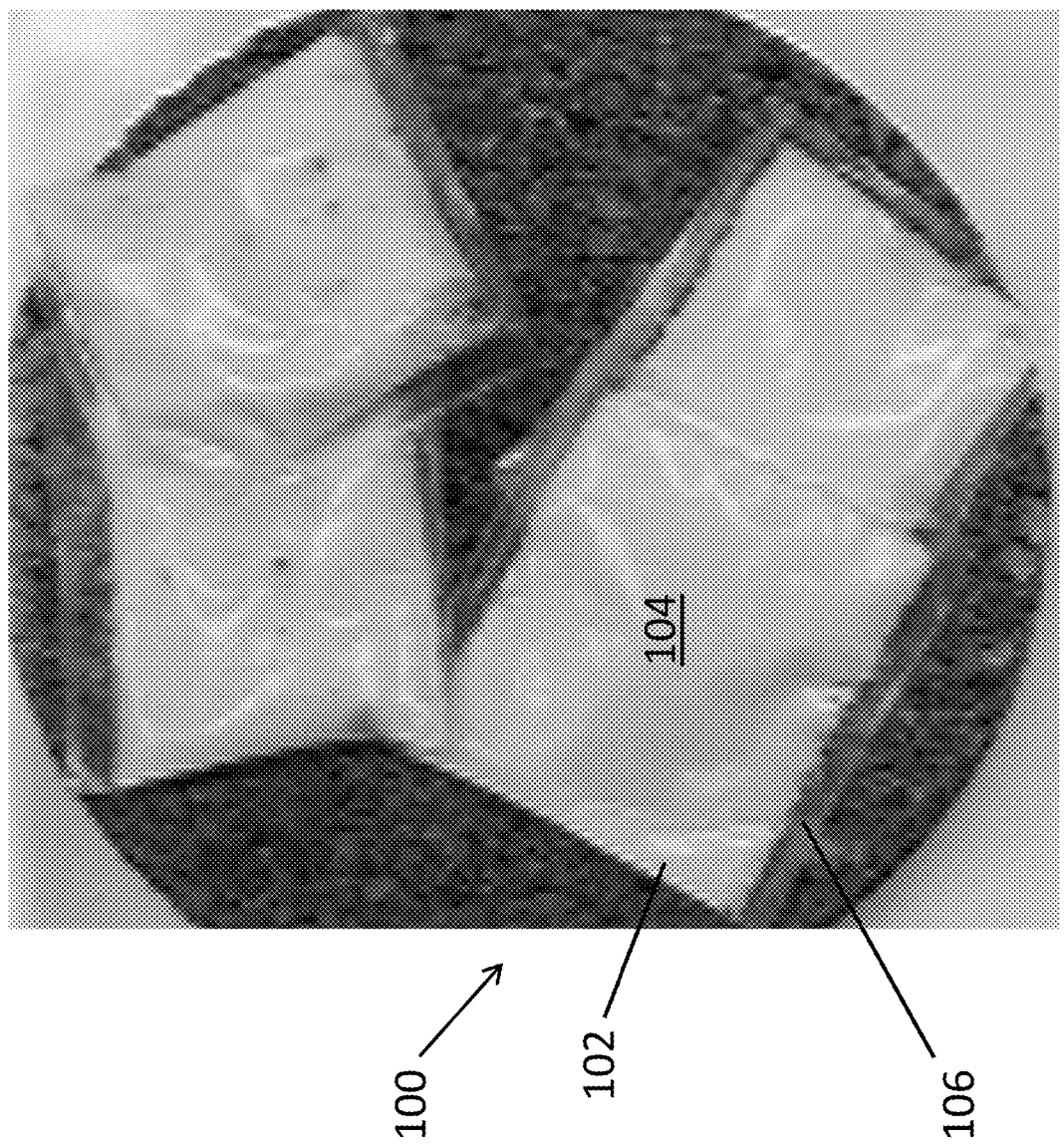
FIG. 1J shows a perspective front view of a hygiene product pod, in accordance with embodiments.

FIG. 1J shows a perspective front view of a hygiene product pod 100. As described herein, the hygiene product pod 100 may comprise a hygiene product 104 sealed in a water-soluble envelope 102. The water-soluble envelope 102 may be sealed 106 around the hygiene product 104 to form a hygiene product 104 filled chamber. In some embodiments, the chamber (and thus the overall impression of the pod 100) may be generally square-shaped (as shown).

In some embodiments, the hygiene product pod 100 may optionally include an external moisture barrier. For example, the moisture barrier may be a hydrophobic coating or film applied to the outer surface of the water-soluble envelope 102. In some embodiments, the moisture barrier may comprise hydrophobic esterified plant tri-glycerides, naturally occurring plant fats, or the like. In some embodiments, the moisture barrier may be configured to breakdown or dissolve in warm water.

FIG. 2 shows a top plan view of a hygiene product pod 110. The hygiene product pod 110 may be substantially similar to the pod 100, so only the differences therebetween will be described in detail.

The pod 110 may comprise a water-soluble envelope 102 in which a hygiene product 104 is disposed as described herein. In contrast to the pod 100, the water-soluble envelope 102 may be formed by sealing a single folded sheet of the water-soluble material around the hygiene product 104. As a result, the hygiene product pod 110 may include a seal region 106 that extends along three sides of the hygiene product 104 and a folded region 112 that extends between opposing ends of the seal region 106.

Figure 3:
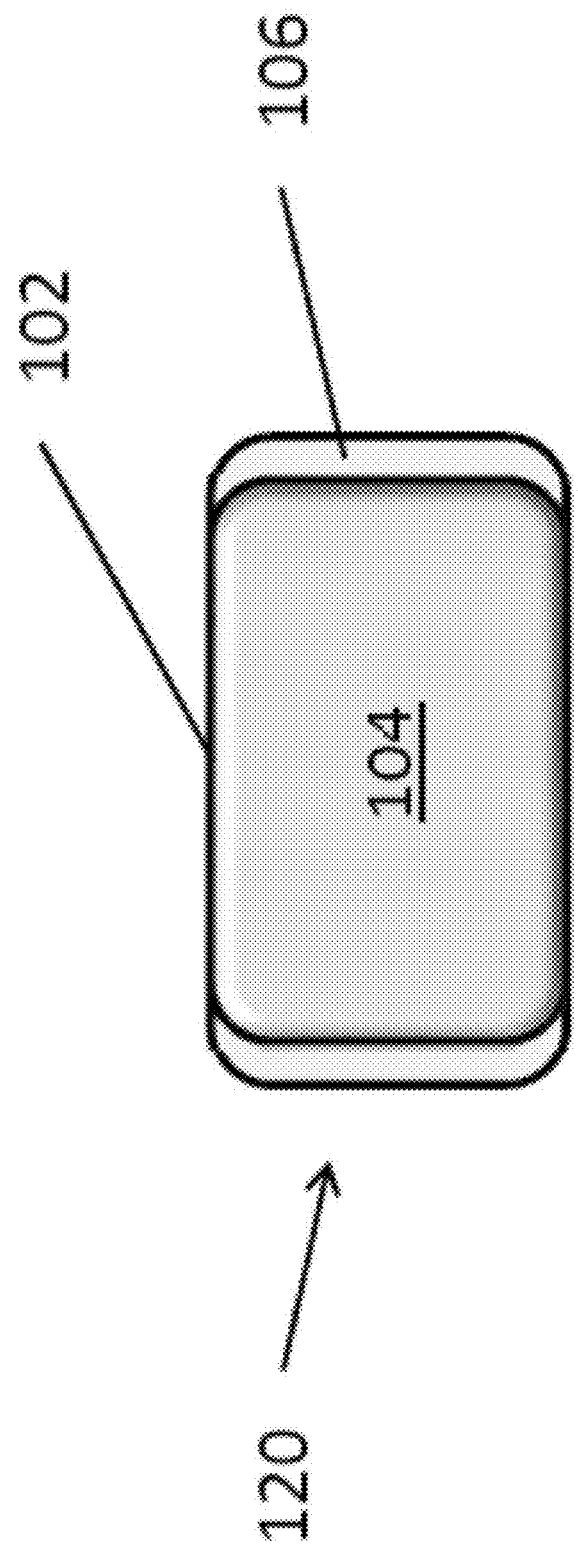
FIG. 3 shows a top view of a hygiene product pod, in accordance with embodiments.

FIG. 3 shows a top view of a hygiene product pod 120. The hygiene product pod 120 may be similar to the hygiene product pod 100, so only the differences therebetween will be described in detail.

The pod 120 may comprise a water-soluble envelope 102 in which a hygiene product 104 is disposed as described herein. In contrast to the hygiene product pod 100, the water-soluble envelope 102 may be formed by sealing opposing ends of a tubular sheet of the water-soluble material following deposition of the hygiene product 104 therein. As a result, the hygiene product pod 120 may include seal regions 106 disposed at opposing ends of the hygiene product pod 120.

While exemplary methods have been described to generate a hygiene product pod, the present disclosure is not limited to any particular method of envelope formation to generate a hygiene product pod.

Hygiene Products

Conventional liquid hygiene products, such as conventional liquid shampoos, typically include a substantial amount of water as a carrier. As a result, water-based shampoos cannot be stably encapsulated in a water-soluble material, as the high water content would prematurely dissolve the water-soluble envelope.

In contrast, non-aqueous solid hygiene products, such as dry shampoos, may be stably encapsulated in a water-soluble envelope. However, non-aqueous hygiene products may not provide the rheological properties and ease of use provided by conventional water-based shampoos and desired by consumers. As a result, non-aqueous solid hygiene products have experienced only limited commercial success.

According to various embodiments, the present hygiene product may be a substantially non-aqueous (anhydrous) liquid or gel. For example, the hygiene product may have a free water content of about 18% or less, such as about 15% wt % or less, about 12 wt % or less, about 9 wt % or less, or about 5 wt % or less. For example, the hygiene product may have a free water content ranging from about 1 wt % to about 12.5 wt %, about 1 wt % to about 9 wt %, from about 1 wt % to about 7 wt %, or from about 1 wt % to about 5 wt %. The hygiene product may have a free water content within a range bounded by any two of the following values: 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, or 18 wt %. The free water content may be determined using methods and systems that will be understood by one of ordinary skill in the art based on the teachings herein. For example, the free water content may be measured using a Karl Fischer volumetric titrator.

In some embodiments, the hygiene product may have a water activity of 0.70 $a_w$ or less in order to maintain product stability. For example, the hygiene product may have a water activity within a range bounded by any two of the following values: 0.10 $a_w$, 0.20 $a_w$, 0.30 $a_w$, 0.40 $a_w$, 0.50 $a_w$, 0.60 $a_w$, or 0.70 $a_w$. Water activity may be measured using methods and systems that will be understood by one of ordinary skill in the art based on the teachings herein. For example, the water activity of the hygiene product may be measured with a resistive electrolytic hygrometer, a capacitance hygrometer, a dew point hygrometer, or by equilibration, or the like.

In some embodiments, the hygiene product may be in the form of a substantially non-aqueous liquid or gel cleansing product, such as a shampoo, a conditioner, a bodywash, or any combination thereof, such as a combined shampoo, bodywash, and/or conditioner. In some embodiments, the hygiene product may be in the form of a substantially non-aqueous shaving product, such as a shaving gel, cream, liquid, or the like.

The hygiene product may include one or more active agents dispersed in a multifunctional carrier. Additional thickeners and other secondary ingredients may also be added to the hygiene product. The one or more active agents may include one or more surfactants (e.g., a surfactant system comprising a mixture of surfactants), one or more cleansing agents, and/or one or more conditioning agents. When present, the one or more surfactants and/or surfactant system may comprise one or more primary surfactants which, when combined with water and optionally mechanically agitated (e.g., rubbed), generate a foam or a froth. When present, the conditioning agents may be configured to counteract the inherent harshness of the surfactants. The conditioning agents, multifunctional carrier, thickeners (e.g., gellants), and/or secondary ingredients may be configured to increase the integrity of a hygiene product pod and/or may operate to disperse the active agent when the hygiene product pod is dissolved in water.

In various embodiments, the active agents may be in the form of a concentrate, such as a shampoo concentrate, a conditioner concentrate, a bodywash concentrate, or any combinations thereof. The active agents may be in the form of a shaving product concentrate in other embodiments. In some embodiments, the active agent may include one or more of the above components in a powdered format.

The multifunctional carrier may be non-aqueous. The multifunctional carrier may be configured such that the hygiene product has rheological properties that are expected by consumers. The multifunctional carrier may also facilitate encapsulation of the hygiene product in a water-soluble envelope and/or may operate to maintain the long-term stability of the hygiene product and/or the water-soluble envelope.

In various embodiments, the multifunctional carrier may operate as surfactant vehicle and/or as a solvent. In some embodiments, the multifunctional carrier may act as a secondary surfactant and enhance the bubble-forming properties of the primary surfactant. In some embodiments, the multifunctional carrier may be selected or configured to lower the overall reactivity of the hygiene product and the water-soluble envelope. For example, the multifunctional carrier may operate to control the free water percentage of the hygiene product.

In some embodiments, the multifunctional carrier may be a non-aqueous liquid or gel. The multifunctional carrier may be configured to moisten one or more of the hygiene product pod components. In some embodiments, the multifunctional carrier may also operate as a conditioner for hair and/or skin. In some embodiments, the multifunctional carrier may comprise one or more secondary surfactants or cosurfactants.

The multifunctional carrier may include, for example, polyols, polyglyceryls, phospholipids, liquid amides, or combinations thereof.

In some embodiments, the hygiene product may comprise one or more primary surfactants. In some embodiments, the hygiene product may not comprise a primary surfactant. For example, a shampoo or bodywash hygiene product may comprise one or more primary surfactants while a conditioner or lotion hygiene product may comprise little (e.g., 5% or less) to no primary surfactants.

Primary Surfactants

In various embodiments, the active agents of the hygiene product may include one or more cleansing agents, such as surfactants. For example, the hygiene product may include one or more anionic, nonionic, cationic, and/or amphoteric surfactants. In some embodiments, the hygiene product may comprise a surfactant system including a combination of different surfactants. The following surfactants may be referred to herein as "primary surfactants".

Non-limiting examples of suitable anionic surfactants include alkali metal sulforicinates, sulfonated glyceryl esters of fatty acids, such as sulfonated monoglycerides of coconut oil acids, salts of sulfonated monovalent alcohol esters such as sodium oleylisethianate, metal soaps of fatty acids, amides of amino sulfonic acids such as the sodium salt of oleyl methyl tauride, sulfonated products of fatty acids nitriles, such as palmitonitrile sulfonate, sulfonated aromatic hydrocarbons such as sodium alpha-naphthalene monosulfonate, condensation products of naphthalene sulfonic acids with formaldehyde, sodium octahydroanthracene sulfonate, alkali metal alkyl sulfates such as sodium lauryl sulfate, ammonium lauryl sulfate or triethanolamine lauryl sulfate, ether sulfates having alkyl groups of 8 or more carbon atoms, such as sodium lauryl ether sulfate, ammonium lauryl ether sulfate, sodium alkyl aryl ether sulfates, and ammonium alkyl aryl ether sulfates, alkylarylsulfonates having one or more alkyl groups of 8 or more carbon atoms, alkylbenzenesulfonic acid alkali metal salts exemplified by hexylbenzenesulfonic acid sodium salt, octylbenzenesulfonic acid sodium salt, calcium salts, decylbenzenesulfonic acid sodium salt, dodecylbenzenesulfonic acid sodium salt, cetylbenzenesulfonic acid sodium salt, and myristylbenzenesulfonic acid sodium salt, sulphuric esters of polyoxyethylene alkyl ether including $CH_3(CH_2)_6CH_2O(C_2H_4O)_2SO_3H$, $CH_3(CH_2)_7CH_2O(C_2H_4O)_{3.5}SO_3H$, $CH_3(CH_2)_8CH_2O(C_2H_4O)_8SO_3H$, $CH_3(CH_2)_{19}CH_2O(C_2H_4O)_4 SO_3H$, and $CH_3(CH_2)_{10}CH_2O(C_2H_4O)_6SO_3H$, sodium salts, potassium salts, and amine salts of alkylnapthylsulfonic acid.

Non-limiting examples of suitable cationic surfactants include various fatty acid amines and amides and their derivatives, and the salts of the fatty acid amines and amides. Examples of aliphatic fatty acid amines include dodecylamine acetate, octadecylamine acetate, and acetates of the amines of tallow fatty acids, homologues of aromatic amines having fatty acids such as dodecylanalin, fatty amides derived from aliphatic diamines such as undecylimidazoline, fatty amides derived from aliphatic diamines, such as undecylimidazoline, fatty amides derived from disubstituted amines such as oleylaminodiethylamine, derivatives of ethylene diamine, quaternary ammonium compounds and their salts which are exemplified by tallow trimethyl ammonium chloride, dioctadecyldimethyl ammonium chloride, didodecyldimethyl ammonium chloride, dihexadecyl ammonium chloride, alkyltrimethylammonium hydroxides such as octyltrimethylammonium hydroxide, dodecyltrimethylammonium hydroxide, or hexadecyltrimethylammonium hydroxide, dialkyldimethylammonium hydroxides such as octyldimethylammonium hydroxide, decyldimethylammonium hydroxide, didodecyldimethylammonium hydroxide, dioctadecyldimethylammonium hydroxide, tallow trimethylammonium hydroxide, trimethylammonium hydroxide, methylpolyoxyethylene cocoammonium chloride, and dipalmityl hydroxyethylammonium methosulfate, amide derivatives of amino alcohols such as beta-hydroxylethylstearylamide, and amine salts of long chain fatty acids.

Non-limiting examples of suitable cationic surfactants include also quaternary ammonium halides such as octyl trimethyl ammonium chloride, dodecyl trimethyl ammonium chloride, hexadecyl trimethyl ammonium chloride, octyl dimethyl benzyl ammonium chloride, decyl dimethyl benzyl ammonium chloride and coco trimethyl ammonium chloride as well as other salts of these materials, fatty amines and basic pyridinium compounds, quaternary ammonium bases of benzimidazolines, polypropanolpolyethanol amines, polyethoxylated quaternary ammonium salts and ethylene oxide condensation products of the primary fatty amines, available from Armak Company, Chicago, Ill. under the tradenames Ethoquad, Ethomeen, or Arquad. Suitable cationic surfactants can also be an esterquat-type compound.

In some embodiments, stearamidopropyl dimethylamine is a cationic, flaked, solid tertiary amine surfactant that may be included in the hygiene product. Stearamidopropyl dimethylamine is an effective conditioning agent and emulsifier. Stearamidopropyl dimethylamine also improves wet combing and feel, lowers dry hair friction, and softens hair.

Non-limiting examples of suitable nonionic surfactants include capryloyl/caproyl methyl glucamide and lauroyl/myristoyl methyl glucamide, lauryldimethylamine oxide (e.g., lauramine oxide), decyl glucosides, polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters. Suitable nonionic surfactants include condensates of ethylene oxide with a long chain (fatty) alcohol or (fatty) acid, condensates of ethylene oxide with an amine or an amide, condensation products of ethylene and propylene oxides, fatty acid alkylol amide and fatty amine oxides. Examples of non-ionic surfactants include polyoxyalkylene alkyl ethers such as polyethylene glycol long chain (12-14C) alkyl ether, polyoxyalkylene sorbitan ethers, polyoxyalkylene alkoxylate esters, polyoxyalkylene alkylphenol ethers, ethylene glycol propylene glycol copolymers, polyvinyl alcohol, and alkylpolysaccharides.

Non-limiting examples of suitable amphoteric surfactants include aliphatic secondary or tertiary amine derivatives in which the aliphatic radical is a linear or branched chain containing 8 to 22 carbon atoms and containing-at least one water-soluble anionic group (for example carboxylate, sulphonate, sulphate, phosphate or phosphonate); mention may also be made of $(C_8-C_{20})$alkyl-betaines, sulphobetaines, $(C_8-C_{20})$alkylamido$(C_1-C_6)$alkyl-betaines, or $(C_8-C_{20})$alkylamido$(C_1-C_6)$alkylsulphobetaines. In some embodiments, bocamidopropyl betaine (CAPB) may be included in the hygiene product as an amphoteric surfactant.

In some embodiments, environmentally-friendly surfactants may be used, such as sulfate-free surfactants, such as sodium lauryl sulfoacetate, alpha olefin sulfonate, or the like, or combinations thereof.

In some embodiments, the hygiene product may include surfactants derived from natural oils, such as coconut oil, safflower oil, or the like, or natural materials such as sugar. For example, the hygiene product may include a sodium cocoyl isethionate (Hostapon SCI-85 C, manufactured by Clariant Corp.), cocamidopropyl betaine (Chembetaine C-42, manufactured by Lubrizol Corp.), cocamidopropyl hydroxysultaine (Chembetaine CAS manufactured by Lubrizol Corp.), capryloyl/caproyl methyl glucamide and lauroyl/myristoyl methyl glucamide (GlucoTain Plus, manufactured by Clariant Corp.), sodium methyl 2-sulfolaurate (Alpha Step PC-48, manufactured by Stepan Co.), alkyl polyglucoside (Pantaren 2000, manufactured by BASF Corp.) lauramine oxide (Mackamine LO, manufactured by Solvay Novecare Corp.), sodium methyl cocoyl taurate, or combinations thereof.

In various embodiments, the hygiene product may include one or more primary surfactants, such as one or more nonionic surfactants, one or more anionic surfactants, one or more cationic surfactants, and/or one or more amphoteric surfactants, or any combination thereof. For example, the hygiene product may include one or more primary surfactants in an amount ranging from about from about 0 wt % to about 50 wt %, such as from about 5 wt % to about 50 wt %, about 10 wt % to about 40 wt %, from about 20 wt % to about 35 wt %, from about 16 wt % to about 34 wt %, or from about 17 to about 33 wt %. In some embodiments, the one or more primary surfactants may be within a range of about 0 wt % to about 5 wt % or within a range of about 10 wt % to about 50 wt %. For example, a conditioner or lotion hygiene product may include the one or more primary surfactants in an amount ranging from about 0 wt % to about 5 wt % while a shampoo or bodywash hygiene product may include the one or more primary surfactants in an amount ranging from about 20 wt % to about 30 wt %. In various embodiments, the hygiene product may include one or more primary surfactants in an amount within a range bounded by any two of the following values: 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 20 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, or 50 wt %. The amount of primary surfactant(s) in the hygiene product may vary depending on the type of hygiene product (e.g., conditioner, lotion, shampoo, shaving product, etc.) and the desired lather of the hygiene product.

In various embodiments, the hygiene product may include a mixture of primary surfactants, such as nonionic surfactants or a combination of nonionic and anionic surfactants or any combination of primary surfactants desired. In some embodiments, the hygiene product may include a surfactant mixture in an amount ranging from about 0 wt % to about 50 wt %, such as from about 5 wt % to about 50 wt %, about 10 wt % to about 40 wt %, from about 20 wt % to about 35 wt %, from about 16 wt % to about 34 wt %, or from about 17 to about 33 wt %. %. In some embodiments, the surfactant mixture may be within a range of about 0 wt % to about 5 wt % or within a range of about 10 wt % to about 50 wt %. For example, a conditioner or lotion hygiene product may include the surfactant mixture in an amount ranging from about 0 wt % to about 5 wt % while a shampoo or bodywash hygiene product may include the surfactant mixture in an amount ranging from about 20 wt % to about 30 wt %. In various embodiments, the hygiene product may include a surfactant mixture in an amount within a range bounded by any two of the following values: 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 20 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, or 50 wt %.

In some embodiments, such as in shampoo and/or bodywash applications, the surfactant system may be free of cationic surfactants. In other words, cationic surfactants may be excluded from the hygiene product in certain applications.

In some embodiments, the surfactant system may include at least one nonionic surfactant in an amount ranging from about 7 wt % to about 25 wt %, such as from about 8 wt % to about 22 wt %, or from about 9 wt % to about 20 wt %. In various embodiments, the surfactant system may include at least one nonionic surfactant in an amount within a range bounded by any two of the following values: 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt %.

In some embodiments, the surfactant system may include at least one anionic surfactant in an amount ranging from about 0 wt % to about 25 wt %, such as from about 8 wt % to about 22 wt %, or from about 9 wt % to about 20 wt %. In various embodiments, the surfactant system may include at least one anionic surfactant in an amount within a range bounded by any two of the following values: 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt %.

In some embodiments, the surfactant system may have an anionic surfactant to nonionic surfactant weight ratio ranging from about 0 to about 2, such as from about 0.5 to about 1.9, or from about 1.3 to about 1.4. In various embodiments, the surfactant system may have an anionic surfactant to nonionic surfactant weight ratio within a range bounded by any two of the following values: 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2.

In some embodiments, the surfactant system may include surfactants selected from sodium cocoyl isothionate, sodium methyl cocoyl taurate, cocamidopropyl hydroxysultaine, capryloyl/caproyl methyl glucamide and lauroyl/myristoyl methyl glucamide, sodium methyl 2-sulfolaurate, alkyl polyglucoside, or any combinations thereof.

According to various embodiments of the present disclosure, the hygiene product may include one or more liquid amides. The liquid amides may be configured to operate as primary or secondary surfactants, solubilizers, emollients, and/or emulsifiers.

For example, the hygiene product may include one or more liquid amides in an amount ranging from about 0 wt % to about 45 wt %, such as from about 0 wt % to about 15 wt %, from about 5 wt % to about 15 wt %, from about 5 wt % to about 40 wt %, from about 6 wt % to about 20 wt %, or from about 8 wt % to about 15 wt %. In various embodiments, the hygiene product may include a oen or more liquid amids in an amount within a range bounded by any two of the following values: 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 20 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, or 45 wt %.

The one or more liquid amides may include Glucotain Plus, chembetaines, lactamide monoethanolamine (LMEA), Dimethyl lauramide/myristamide, or the like, or any combination thereof. In some embodiments, one or more liquid amide may be a primary surfactant. Alternatively, or in combination, one or more liquid amide may be a secondary surfactant, solubilizer, emollient, emulsifier, and/or diluent.

For example, lactamide monoethanolamine (LMEA) (Phoenamid LMEA, available from Phoenix Chemical, Inc.) is a liquid amide humectant that may impart smooth, non-greasy feel and sheen to skin and/or hair.

In various embodiments, the hygiene product may include LMEA in an amount ranging from about 0 wt % to about 20 wt %, such as from about 1 wt % to about 15 wt %, from about 2 wt % to about 12 wt %, or from about 3 wt % to about 9 wt %. In various embodiments, the surfactant system may include LMEA in an amount within a range bounded by any two of the following values: 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

Dimethyl lauramide/myristamide (Ninol CAA, available from Stephan Co.) is a liquid amide secondary surfactant configured to optimize carrier characteristics without reducing cleansing performance. Ninol CAA is a nitrosamine-free, 100% active, liquid amide that enables the imperceptible reduction of surfactant levels, solubilizes fragrances, and may substitute other amides.

In various embodiments, the hygiene product may include Ninol CAA in an amount ranging from about 0 wt % to about 20 wt %, such as from about 1 wt % to about 15 wt %, from about 3 wt % to about 10 wt %, or from about 2 wt % to about 4 wt %. In various embodiments, the surfactant system may include Ninol CAA in an amount within a range bounded by any two of the following values: 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

Polyol Solvents

In some embodiments, the multifunctional carrier may include one or more polyol solvents that are compatible with water-soluble envelope materials such as PVOH. For example, the one or more polyol solvents may include nonvolatile, low molecular weight molecules that can modify a PVOH polymer matrix, thereby increasing free volume and chain mobility. Accordingly, one or more of the polyol solvents may function as a plasticizer to improve the flexibility and processability of the water-soluble envelope.

The one or more polyol solvents may operate as solvents, humectants, and/or may control viscosity. In some embodiments, the hygiene product may include from about 5 wt % to about 75 wt %, such as from about 10 wt % to about 70 wt %, about 20 wt % to about 72 wt %, about 40 wt % to about 75 wt %, about 5 wt % to about 35 wt %, about 10 wt % to about 30 wt %, from about 15 wt % to about 30 wt %, from about 15 wt % to about 25 wt %, of the one or more polyol solvents. In various embodiments, the hygiene product may include one or more polyol solvents in an amount within a range bounded by any two of the following values: 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 20 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, or 75 wt %.

In some embodiments, the hygiene product may include a mixture of two or more polyol solvents. For example, the hygiene product may include from about 5 wt % to about 75 wt %, such as from about 10 wt % to about 70 wt %, about 20 wt % to about 72 wt %, about 40 wt % to about 75 wt %, about 5 wt % to about 35 wt %, about 10 wt % to about 30 wt %, from about 15 wt % to about 25 wt %, or about 20 wt %, of the polyol solvent mixture. In various embodiments, the hygiene product may include polyol solvent mixture in an amount within a range bounded by any two of the following values: 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, or 75 wt %.

In some embodiments, the polyols may include glycols and/or glycerin. For example, the glycols may be selected from ethylene glycol, poly(ethylene glycol), butylene glycol (e.g., 1,3-butylene glycol), hexylene glycol, propylene glycol, or dipropylene glycol. In some embodiments, the polyol mixture may include of at least two glycols, at least three glycols, or at least four glycols, and may additionally include glycerin.

Hexylene glycol may provide anti-microbial activity, emolliency, moisturization, and/or skin conditioning effects to the hygiene product. Hexylene glycol may also operate to stiffen the water-soluble envelope.

According to various embodiments, the hygiene product may include from 0 wt % to about 5 wt %, such as from about 0.5 wt % to about 4 wt %, or from about 1 wt % to about 3 wt % hexylene glycol. In some embodiments, the hexylene glycol content may be limited to about 2 wt %, in order to reduce eye irritation. In some embodiments, the hexylene glycol content may be within a range bounded by any two of the following values: 0 wt %, 0.5 wt %, 1 wt %, 1.5 wt %, 2 wt %, 2.5 wt %, 3 wt %, 3.5 wt %, 4 wt %, 4.5 wt %, or 5 wt %.

Propylene glycol is highly hydrophilic and may operate as a humectant that moisturizes the skin and/or hair. Propylene glycol may also operate as a solvent to the active agents and may operate as a plasticizer with respect to the water-soluble envelope.

According to various embodiments, the hygiene product may include, based on the total weight of the hygiene product, from about 5 to about 25 wt %, such as from about 10 wt % to about 20 wt %, or about 15 wt % propylene glycol. In some embodiments, the polyol mixture may include propylene glycol primary component. In other words, the polyol solvent mixture may include more propylene glycol than other polyol solvents. In various embodiments, the hygiene product may include propylene glycol in an amount within a range bounded by any two of the following values: 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %.

Glycerin operates as an active ingredient solvent, an envelope plasticizer, and a humectant. According to various embodiments, the hygiene product may include from about 0.5 wt % to about 15 wt %, such as from about 1 wt % to about 10 wt %, or from about 2 wt % to about 8 wt % glycerin. In some embodiments, the glycerin content may be limited to 8 wt % or less, to reduce and/or prevent degradation to the water-soluble envelope. In some embodiments, the glycerin content may be within a range bounded by any two of the following values: 0 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, 10 wt %, 10.5 wt %, 11 wt %, 11.5 wt %, 12 wt %, 12.5 wt %, 13 wt %, 13.5 wt %, 14 wt %, 14.5 wt %, or 15 wt %.

Di-propylene glycol is a highly effective solvent, solubilizing agent, and carrying agent for fragrances. The hygiene product may include an amount of di-propylene glycol sufficient to solubilize an amount of fragrance oils and/or essential oils included in the hygiene product. For example, the hygiene product may include a 2:1 weight ratio of di-propylene glycol to fragrances and/or essential oils.

According to various embodiments, the hygiene product may include from 0 wt % to about 7 wt %, such as from about 0.1 wt % to about 6 wt %, or about 2 wt % to about 5 wt % di-propylene glycol. In some embodiments, the di-propylene glycol content may be within a range bounded by any two of the following values: 0 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, or 7 wt %.

Butylene glycol operates as a humectant that moisturizes the skin and/or hair. Butylene glycol may also operate as a solvent with respect to the active agents, and may operate as a plasticizer with respect to the water-soluble envelope. Butylene glycol may also operate as a conditioning agent.

According to various embodiments, the hygiene product may include, based on the total weight of the hygiene product, from 0 wt % to about 10 wt %, such as from about 0.5 wt % to about 8 wt %, or from about 2 wt % to about 6 wt %, butylene glycol. In some embodiments, the butylene glycol content may be limited to 10 wt % or less, in order to prevent an excessive viscosity increase in the hygiene product. In some embodiments, the hygiene product may be free of butylene glycol. In some embodiments, the butylene glycol content may be within a range bounded by any two of the following values: 0 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, or 10 wt %.

Polyglyceryl Fatty Acid Ester Chassis

In some embodiments, the multifunctional carrier may include one or more polyglyceryl fatty acid ester (PGE) chassis configured to, for example, provide emulsification and/or increase foaming. The PGE chassis may operate to solvate the active agents without reducing envelope stability. In some instances, the PGE chassis may act as solubilizers, rheology modifiers, diluents, water-replacement ingredients in a near-anhydrous system, and/or non-reactive carrier solvents. The PGE chassis may provide body to the hygiene product without significantly affecting the structure and/or solubility of the water-soluble envelope.

The PGE chassis may include polyglyceryl monoesters and multi-esters. In shampoo and bodywash applications, the PGE chassis may have a hydrophilic-lipophilic balance (HLB) value of at least 9, such as at least 10 or at least 11. For example, the PGE chassis may comprise polyglyceryl-2 caprate, polyglyceryl-3 caprate, polyglyceryl-2 laurate, polyglyceryl-3 laurate, polyglyceryl-6 esters, polyglyceryl-2 oleate, polyglyceryl-2 monostearate, or any combinations thereof.

In various embodiments, the hygiene product may include from about 0 wt % to about 60 wt %, such as from about 0.1 to about 60 wt %, from about 0 wt % to about 50 wt %, from about 10 wt % to about 50 wt %, from about 12 wt % to about 49 wt %, or from about 15 wt % to about 35 wt % of the PGE chassis. For example, the PGE chassis may be about 30% for a shampoo or conditioner hygiene product and about 50% for a bodywash hygiene product. In various embodiments, the hygiene product may include the PGE chassis in an amount within a range bounded by any two of the following values: 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, or 60 wt %.

Polyglyceryl-2 caprate is a liquid compound derived from polyglycerin and a fatty acid. Polyglyceryl-2 caprate may operate as an emulsifier to create fine, creamy bubbles, especially when combined with anionic surfactants. It is an excellent thickener with good thermostable viscosity. Polyglyceryl-2 caprate can be used as deodorizing ingredient because of its reaction to gram-positive bacteria, making it a desirable addition for anhydrous body wash and shampoo formulations.

The hygiene product may include, from about 0 wt % to about 50 wt %, such as from about 0.1 wt % to about 40 wt %, or from about 5 wt % to about 30 wt %, polyglyceryl-2 caprate. Amounts of over 50 wt % are possible, but may prevent the hygiene product from including appropriate amounts of other ingredients, such as surfactants, conditioning agents, etc., for a given application. In various embodiments, the hygiene product may include polyglyceryl-2 caprate in an amount within a range bounded by any two of the following values: 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, or 50 wt %.

Polyglyceryl-3 caprate is a liquid nonionic co-surfactant and refatting agent with an estimated HLB value of 10-13. This polyethylene glycol (PEG)-free refatting agent helps to prevent the skin from drying and provides a luxurious and soft skin feel. It also provides a mild antimicrobial and deodorizing effect.

The hygiene product may include from about 0 wt % to about 25 wt %, such as from about 0.1 wt % to about 20 wt %, or from about 5 wt % to about 15 wt %, polyglyceryl-3 caprate. It is believed that polyglyceryl-3 caprate amounts of greater than 25% may result in decreased foam height and bubble size in some formulations. In various embodiments, the hygiene product may include polyglyceryl-3 caprate in an amount within a range bounded by any two of the following values: 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt %.

In some embodiments, the hygiene product may include polyglyceryl-2 caprate esters in an amount ranging from about 10 wt % to about 30 wt %, and polyglyceryl-3 caprate in an amount ranging from about 4 wt % to about 24 wt %.

Polyglyceryl-3 laurate may provide moisturization, humectant, and emollient properties in both hair and skin formulations. Polyglyceryl-3 laurate is also completely dispersible in water.

The hygiene product may include from about 0 wt % to about 30 wt %, such as from about 0.1 wt % to about 20 wt %, or from about 5 wt % to about 18 wt %, polyglyceryl-3 laurate. It is believed that polyglyceryl-3 laurate amounts of greater than 20 wt % may result in decreased foam height and bubble size in some formulations. In various embodiments, the hygiene product may include polyglyceryl-3 laurate in an amount within a range bounded by any two of the following values: 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %.

Sunflower oil polyglyceryl-6 esters may be obtained by the transesterification of sunflower seed oil and polyglycerin-6. The compound is an amphiphilic ester that promotes shine and skin and hair softening attributes without negatively affecting the foam by contributing to emollient overload.

The hygiene product may include from about 0 to about 15 wt %, such as from about 0.1 wt % to about 12 wt %, from about 1 wt % to about 11 wt %, or from about 2 wt % to about 7 wt %, polyglyceryl-6 esters. It is believed that the hygiene product may include polyglyceryl-6 esters in amounts of up to 50 wt %. However, amounts of 15 wt % or less may be preferable due to the extreme cost and low commercial availability of this ingredient. In some embodiments, the hygiene product may include polyglyceryl-6 esters in an amount within a range bounded by any two of the following values: 0 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, 10 wt %, 10.5 wt %, 11 wt %, 11.5 wt %, 12 wt %, 12.5 wt %, 13 wt %, 13.5 wt %, 14 wt %, 14.5 wt %, 15 wt %, 20 wt %, 25 wt %, 30 wt %, 35 wt %, 40 wt %, 45 wt %, or 50 wt %.

In some embodiments, the hygiene product may include polyglyceryl-6 esters in an amount ranging from about 1 wt % to about 11 wt %, and polyglyceryl-2 caprate in an amount ranging from about 5 wt % to about 15 wt %.

In conditioning applications, the hygiene product may include PGEs having HLB values of about 9 or less, such as about 8 or less, or about 6 or less. In such hygiene products, the PGEs may be used in conjunction with cationic conditioning agents and triglycerides.

Additional Conditioners

In some embodiments, the hygiene product may include one or more additional conditioners. Non-limiting examples of suitable additional conditioners include petrolatum, fatty acids, esters of fatty acids, fatty alcohols, ethoxylated alcohols, polyol polyesters, glycerin mono-esters, glycerin poly-esters, epidermal and sebaceous hydrocarbons, lanolin, straight and branched hydrocarbons, silicone oil, silicone gum, vegetable oil, vegetable oil adduct, hydrogenated vegetable oils, nonionic polymers, natural waxes, synthetic waxes, polyolefinic glycols, polyolefinic monoester, polyolefinic polyesters, cholesterols, cholesterol esters, triglycerides and mixtures thereof.

Preferable additional conditioners may include pyrrolidone carboxylic acid (PCA) glyceryl Oleate (SOFTISAN conditionHAIR, available from IOI Oleo GmbH), which is a natural skin and hair conditioning agent, caprylyl pyrrolidone, lauryl pyrrolidone, betaine (Genencare OSMS BA, available from DuPont Nutrition and Biosciences Inc.), polyethylene glycol/fumed silica (POLYOX, available from DuPont Nutrition and Biosciences Inc.), and polyethylene oxide (molecular weight within a range of about 100,000 to about 600,000).

An additional conditioner as described herein can be added in an amount of from about 0 to about 15 wt %, such as from about 0.1 wt % to about 12 wt %, from about 0.5 wt % to about 10 wt %, or from about 1 wt % to about 5 wt %. In some embodiments, the additional condition can be present at a weight percent of: 0 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, 10 wt %, 10.5 wt %, 11 wt %, 11.5 wt %, 12 wt %, 12.5 wt %, 13 wt %, 13.5 wt %, 14 wt %, 14.5 wt %, 15 wt %, or 20 wt %.

Additional Emulsifiers/Stabilizers

In various embodiments, the hygiene product may include one or more additional emulsifiers that may operate to further stabilize the hygiene product. For example, the hygiene product may include non-ionic, oil-in-water emulsifiers configured to create a lamellar or bilayered structure. For example, the emulsifiers may include non-ionic emulsifiers, such as, a mixture of cetearyl alcohol and cetearyl glucoside (Montanov 68, available from Seppic Corp.), glycerol stearate (Lipo GMS 450, available from Lipo Chemicals Corp.), or a combination thereof.

In some embodiments, the hygiene product may include a non-ionic, oil-in-water emulsifier in an amount ranging from about 0 wt % to about 3 wt %, such as from about 0.2 wt % to about 2 wt %, or from about 0.8 wt % to about 1.3 wt %. In various embodiments, hygiene product may include a non-ionic, oil-in-water emulsifier in an amount within a range bounded by any two of the following values: 0 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, 2 wt %, 2.1 wt %, 2.2 wt %, 2.3 wt %, 2.4 wt %, 2.5 wt %, 2.6 wt %, 2.7 wt %, 2.8 wt %, 2.9 wt %, or 3 wt %.

In some embodiments, the emulsifiers may include polyethylene glycol/fumed silica (POLYOX, available from DuPont Nutrition and Biosciences Inc.), polyethylene glycol, hygroscopic polymers, such as guar gum (e.g., cyamopsis tetragonoloba gum), cationic guar gum, xanthan gum, starch, pregelatinized starch, modified starches, such as hydroxypropyl starch phosphate and sodium starch glycolate, honey, polyvinyl pyrolidone (PVP), ExpertGel EG312 (poloxamer 338/PPG-12/SMDI copolymer) available from DKSH Inc., ExpertGel EG412 (poloxamer 407, PPG-12/SMDI copolymer) available from DKSH Inc, combinations thereof, or the like. In some embodiments, the thickeners may include cellulose derivatives such as carboxymethyl cellulose, cellulose gum, or tylose powder. In some embodiments, the hygiene product may include a polyoxyethylene ether.

In some embodiments, the emulsifiers may include a hydroscopic polymer thickener in an amount ranging from about 0 wt % to about 0.4 wt %, such as from about 0.05 wt % to about 0.3 wt %, or from about 0.1 wt % to about 0.2 wt %. In various embodiments, hygiene product may include a hydroscopic polymer thickener in an amount within a range bounded by any two of the following values: 0 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.11 wt %, 0.12 wt %, 0.13 wt %, 0.14 wt %, 0.15 wt %, 0.16 wt %, 0.17 wt %, 0.18 wt %, 0.19 wt %, 0.2 wt %, 0.21 wt %, 0.22 wt %, 0.23 wt %, 0.24 wt %, 0.25 wt %, 0.26 wt %, 0.27 wt %, 0.28 wt %, 0.29 wt %, 0.3 wt %, 0.31 wt %, 0.32 wt %, 0.33 wt %, 0.34 wt %, 0.35 wt %, 0.36 wt %, 0.37 wt %, 0.38 wt %, 0.39 wt %, 0.4 wt %.

For example, the hygiene product may include a modified starch thickener in an amount ranging from about 0.1 wt % to about 3 wt %, such as from about 0.2 wt % to about 2 wt %, or from about 0.3 wt % to about 1 wt %. In various embodiments, hygiene product may include a modified starch thickener in an amount within a range bounded by any two of the following values: 0 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, 2 wt %, 2.1 wt %, 2.2 wt %, 2.3 wt %, 2.4 wt %, 2.5 wt %, 2.6 wt %, 2.7 wt %, 2.8 wt %, 2.9 wt %, or 3 wt %.

In some embodiments, the emulsifiers may include nonionic surfactants configured to form a lamellar network. For example, the emulsifiers may include a lamellar network formed from polyoxyethylene ethers including a mixture of high molecular mass saturated fatty alcohols, mainly cetyl alcohol and stearyl alcohol, such as ceteareth-20. In some embodiments, the hygiene product may include a nonionic surfactant in an amount ranging from about 8 wt % to about 18 wt %, such as about 12 wt %.

Lauryl lactyl lactate (Stepan-Mild L3, available from Stephan Co.) is a naturally-derived, multi-functional emollient/surfactant formed as the product of reacting lauryl alcohol and lactic acid. Stepan-Mild L3 may operate as a viscosity builder, foam booster, emulsifier, and emollient.

In various embodiments, the hygiene product may include STEPAN-MILD L3 in an amount ranging from about 0 wt % to about 20 wt %, such as from about 0.5 wt % to about 15 wt %, from about 1 wt % to about 10 wt %, or from about 2 wt % to about 7 wt %. In some embodiments, the Stepan-Mild L3 content may be within a range bounded by any two of the following values: 0 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, 10 wt %, 10.5 wt %, 11 wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, or 20 wt %.

According to various embodiments of the present disclosure, the hygiene product may include one or more phospholipids configured to operate as a foam enhancer and/or cleanser. For example, the hygiene product may include from about 0 wt % to about 20 wt %, such as from about 1 wt % to about 15 wt %, from about 2 wt % to about 15 wt %, from about 5 wt % to about 10 wt %, or from about 6 wt % to about 8 wt % of the one or more phospholipids. In some embodiments, the one or more phospholipids may be within a range bounded by any two of the following values: 0 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, 10 wt %, 10.5 wt %, 11 wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, or 20 wt %.

In some embodiments, the hygiene product may include phospholipids selected from cocamidopropyl PG-dimonium chloride phosphate (Cola Lipid C, manufactured by Colonial Chemical Inc.), linoleamidopropyl PG-dimonium chloride phosphate (Cola Lipid SAFL, manufactured by Colonial Chemical Inc.), or combinations thereof.

In some embodiments, the hygiene product may include substantially equal amounts of different phospholipids. For example, the hygiene product may include substantially equal amounts of Cola Lipid C and Cola Lipid SAFL.

Carrier Diffusion Control

In some embodiments, the water-soluble envelope of the hygiene product pod may have some amount of permeability with respect to the hygiene product. This could lead to diffusion of one or more components of the hygiene product through the water-soluble envelope over time, which may reduce pod shelf-life. For example, a water-soluble envelope formed of PVOH could inherently have some amount permeability with respect the butylene glycol carrier. Accordingly, the hygiene product may include thickeners configured to reduce carrier permeation through the water-soluble envelope.

In various embodiments, thickeners such as carboxymethyl cellulose, cellulose gum, or tylose powder may be optionally added to the hygiene product to reduce diffusion through the water-soluble envelope. For example, tylose powder may be added to the hygiene product in an amount ranging from about 0.05 wt % to about 0.5 wt %, such as from about 0.15 wt % to about 0.25 wt %, or about based on the total weight of the hygiene product.

Secondary Ingredients

In various embodiments, the hygiene product pods may include secondary ingredients. For example, the secondary ingredients may include buffers/pH adjusters, dyes/colorants, moisturizers, fragrances, vitamins, texture modifiers, essential oils, foam enhancers, and anti-microbial agents, combinations thereof, or the like. In various embodiments, hygiene products may include from about 0 wt % to about 8 wt % secondary ingredients. In some embodiments, the secondary ingredients may be within a range bounded by any two of the following values: 0 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, or 8 wt %.

The buffers/pH adjusters may include calcium ions, potassium ions, or hydroxide ions, any combination thereof, or any salts or compounds capable of generation such ions. The buffers/pH adjusters may be blended at various ratios, in order to provide a suitable pH. For example, a suitable amount of buffer/pH adjuster may be added to the hygiene product to provide a slightly acidic pH for compatibility with PVOH envelopes. For example, the hygiene product may advantageously have a room temperature pH ranging from about 5 to about 9, such as from about 4.8 to about 6.9, or from about 5.0 to about 6.8. In some embodiments, the hygiene product may have a room temperature pH within a range bounded by any two of the following values: 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, or 9.

In some embodiments, the secondary ingredients may include essential oils such as argan oil, sunflower oil, lavender oil, rosemary oil, cedar wood oil, thyme oil, peppermint oil, chamomile oil, sage oil, lemon oil, patchouli oil, tea tree oil, ylang oil, vetiver oil, carrot seed oil, cypress oil, helichrysum oil, combinations thereof, or the like.

In some embodiments, hygiene products may include moisturizers such as betaine (Genencare OSMS BA, manufactured by Dupont Corp.), polyquaterium-10, or brassica alcohol and brassicyl valinate esylate (AminoSensyl™ HC). In some embodiments, hygiene products may include vitamins such as tocopherol, DL Panthenol, or combinations thereof.

Secondary ingredients useful for improving dissolvability and/or foaming may include coconut milk powder, arrow root powder, colloidal oatmeal powder, combinations thereof, or the like. In various embodiments, hygiene products may include a secondary ingredient, such as coconut milk powder, arrow root powder, colloidal oatmeal powder, or any combination thereof, in an amount ranging from about 0 wt % to about 22 wt %, such as from about 5 wt % to about 20 wt %, or from about 8 wt % to about 15 wt %. Colloidal oatmeal powder may also operate as a texture modifier to provide a smoother texture. In various embodiments, the hygiene product may include a secondary ingredient, such as coconut milk powder, arrow root powder, colloidal oatmeal powder, or any combination thereof, in an amount within a range bounded by any two of the following values: 0 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, or 22 wt %.

Any suitable colorant may be used. Hygiene products may include a colorant in an amount ranging from about 0 wt % to about 0.3 wt %, such as from about 0.1 wt % to about 0.2 wt %.

In various embodiments, a suitable fragrance may be used. Useful fragrances may be in liquid form, such as traditional fragrances that are combinations of synthetic and natural compounds, natural fragrances that consist of a blend of natural extracts and essential oils, or essential oils in the pure and neat form. Hygiene products may include a fragrance oil in an amount ranging from about 0 wt % to about 1.5 wt %, such as from about 0.5 wt % to about 1 wt %. In various embodiments, hygiene product may include a fragrance oil in an amount within a range bounded by any two of the following values: 0 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, or 1.5 wt %.

In various embodiments, texture modifiers may include micro or macro abrasive agents, such as when a pod includes a body scrub. Suitable abrasive agents include, for example, nut powders, silica powders, polymer beads such as wax beads, combinations thereof, or the like. In some embodiments, hygiene products may include an abrasive agent in an amount ranging from about 0 wt % to about 3 wt %, such as from about 0.1 wt % to about 2 wt %, or from about 0.2 wt % to about 1 wt %. In various embodiments, hygiene product may include an abrasive agent in an amount within a range bounded by any two of the following values: 0 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, 2 wt %, 2.1 wt %, 2.2 wt %, 2.3 wt %, 2.4 wt %, 2.5 wt %, 2.6 wt %, 2.7 wt %, 2.8 wt %, 2.9 wt %, or 3 wt %.

In various embodiments, anti-microbial agents may be natural materials having anti-microbial effects. For example, anti-microbial agents may include thyme oil, tea tree oil, oregano oil, lavender oil, citrus essential oil, grapefruit seed extract, olive leaf extract, honey, or the like. Hygiene products may include an anti-microbial agent in an amount ranging from about 0 wt % to about 3 wt %, such as from about 0.1 wt % to about 2 wt %, or from about 0.2 wt % to about 1 wt %. In various embodiments, hygiene product may include an anti-microbial agent in an amount within a range bounded by any two of the following values: 0 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, 2 wt %, 2.1 wt %, 2.2 wt %, 2.3 wt %, 2.4 wt %, 2.5 wt %, 2.6 wt %, 2.7 wt %, 2.8 wt %, 2.9 wt %, or 3 wt %.

Method of Using Hygiene Product Pods

Figure 4:
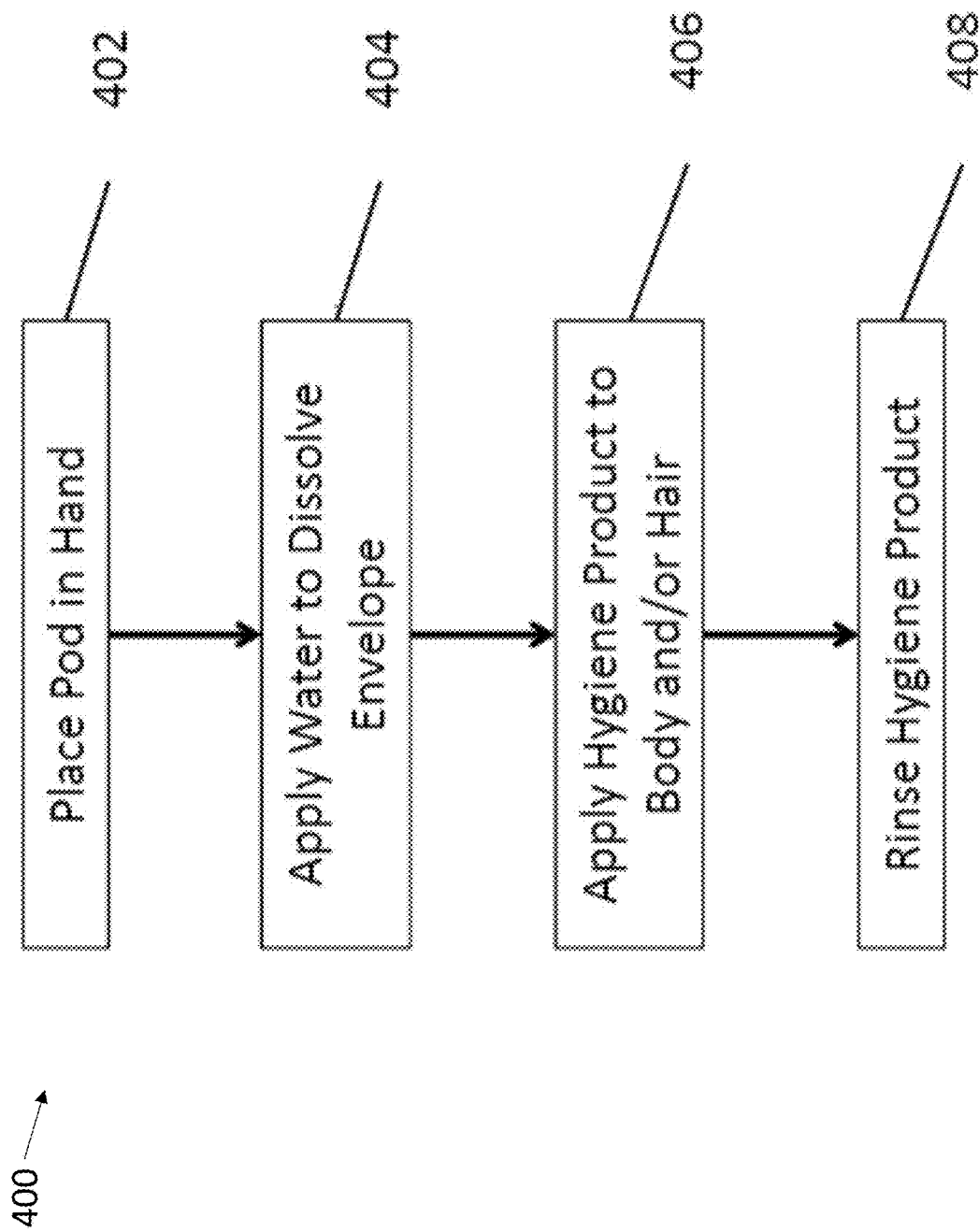
FIG. 4 shows a flow chart of a method of using a hygiene product pod, in accordance with embodiments.

FIG. 4 shows a process flow diagram of a method 400 of using a hygiene product pod. The hygiene product pod may be substantially similar to any of the hygiene product pods described herein.

At Step 402, a hygiene product pod may be place in the hand of a user. For example, the hygiene product pod may be removed from a container or other packaging by the user. In some embodiments, the container (e.g., a die-line box) may hold a single hygiene product pod and may be configured to limit the exposure of the hygiene product pod contained therein to moisture. In some embodiments, the container may include multiple hygiene product pods and may be configured to limit the exposure of the hygiene product pods contained therein to moisture. The container may be formed of water-resistant paper or paperboard, such as the types of paper used for packaging soap, sugar, flour, or the like. In other embodiments, the pods may be packaged in biodegradable or recyclable packs, for example, in blister packs, polylactic acid bags, or the like. In other embodiments, the pods may be packaged in tubes, reusable travel containers, or the like. Accordingly, the hygiene product pods may be packaged in a single dose format but distributed in bulk to the user with minimal environmental impact.

At Step 404, water may be applied to the hygiene product pod. For example, water may be applied to the hygiene product pod while holding the hygiene product pod in one's hands. In some embodiments, friction and/or agitation may also optionally be applied to the hygiene product pod. The hygiene product pod may remain in contact with the water in the user's hand and the optional friction may be applied, for a time period sufficient for the water to dissolve the water-soluble envelope of the hygiene product pod and release the hygiene product contained therein. For example, a time period for completely or substantially completely dissolving the water-soluble envelope of the pod may range from about 0.5 seconds to about 1 minute, such as from about 1 second to about 30 seconds, from about 1 second to about 20 seconds, or from about 1 second to about 10 seconds. The dissolution time may vary according to an amount of applied friction and/or the temperature of the applied water (e.g., increased friction and/or water temperatures may result in a reduced dissolution time).

At Step 406, the hygiene product may be applied to the body of the user. For example, the hygiene product may be applied to the hair of the user, such as when the hygiene product is in the form of a shampoo and/or a combined shampoo, conditioner, and/or bodywash. In some embodiments, the hygiene product may be applied to the body and/or hair of the user, for example when the hygiene product is in the form of bodywash, a combined shampoo and bodywash, and/or a combined bodywash, shampoo, and conditioner. In some embodiments, the hygiene product may be applied to areas of the user's skin where hair is intended to be removed, for example when the hygiene product is in the form of a shaving product.

At Step 408, the hygiene product may be rinsed from the applied area or areas. Alternatively, for example when the hygiene product is a leave-in conditioner, the hygiene product may not be rinsed from the applied area or areas.

Although the steps above show a method 400 of using a hygiene product pod in accordance with embodiments, a person of ordinary skill in the art will recognize many variations based on the teaching described herein. The steps may be completed in a different order. Steps may be added or deleted. Some of the steps may comprise sub-steps. Many of the steps may be repeated as often as necessary to assemble at least a part of an article. For example, in some embodiments, Step 408 may be omitted in order to allow the hygiene product to remain on the applied area or areas.

EXEMPLARY FORMULATIONS

Examples 1-15 and Comparative Examples 1-5—Hygiene Product Compositions

Tables 1 and 2 include Examples 1-15 of exemplary hygiene product compositions. Table 3 includes Comparative Examples 1-5 of comparative hygiene product compositions.

TABLE 1

Exemplary hygiene product compositions 1-7

| Component | Ex. 1 Wt. % | Ex. 2 Wt. % | Ex. 3 Wt. % | Ex. 4 Wt. % | Ex. 5 Wt. % | Ex. 6 Wt. % | Ex. 7 Wt. % |
|---|---|---|---|---|---|---|---|
| Hostapon SCI-85 P | 13 | 14.3 |  | 11 |  | 8 | 10.5 |
| Chembetaine CAS | 3 | 3 | 3 | 3 | 3 | 3 | 3 |
| Glucotain Plus | 6 | 9 | 6 | 6 | 6 | 5 | 8.5 |
| Alpha Step PC-48 |  |  |  |  |  |  | 6 |
| Alkyl Polyglucoside |  |  | 8 | 11 | 11 | 2 | 1 |
| Propylene Glycol | 5 | 9 | 9 | 9 | 11 | 11.5 | 14 |
| Hexylene Glycol | 2 | 2 | 2 | 2 | 2 | 2 | 2 |
| Di-propylene Glycol | 7 | 6 | 6 | 5 | 6 | 4 | 2 |
| Glycerin | 3 | 4 | 4 | 4 | 4 | 4 | 6 |
| Polyglyceryl-6 Est. |  |  |  | 10 | 10 | 7 | 3 |
| Polyglyceryl-3 Cap. |  |  |  |  |  |  |  |
| Polyglyceryl-2 Cap. |  |  | 12.5 | 10.5 | 10.9 | 10 | 14 |
| Cola Lipid C | 5 | 4 | 4 | 4 | 4 | 4 | 4 |
| Cola Lipid SAFL | 3 | 2 | 2 | 2 | 2 | 2 | 2 |
| Phoenamid LMEA | 11 | 11 | 11 | 8 | 9 | 9.1 | 7.8 |
| Stepan Mild L3 | 10.85 | 12 | 13 | 2 | 4 | 4 | 5 |
| Nino CAA | 10.85 | 11 | 12 | 2 | 4 | 4 | 3 |
| Additives | 19.2 | 9.4 | 7.5 | 10 | 13.1 | 11.4 | 6.6 |

TABLE 2

Exemplary hygiene product compositions 8-15

| Component | Ex. 8 Wt. % | Ex. 9 Wt. % | Ex. 10 Wt. % | Ex. 11 Wt. % | Ex. 12 Wt. % | Ex. 13 Wt. % | Ex. 14 Wt. % | Ex. 15 Wt. % |
|---|---|---|---|---|---|---|---|---|
| Hostapon SCI-85 P | 11.5 | 9 | 13 | 8 | 11 | 13 | 10 | 11.5 |
| Chembetaine CAS | 3 | 3 | 3 | 3 | 3 | 3 | 3 | 3 |
| Glucotain Plus | 8.5 | 5.5 | 5.5 | 5.5 | 5.5 | 5.5 | 5.5 | 5.5 |
| Alpha Step PC-48 | 6 | 3.5 | 4.5 | 4.5 | 5.5 | 5.5 | 5 | 4.35 |
| Alkyl Polyglucoside | 1 | 1 | 1 | 1 | 1 | 1 | 1.2 | 1.5 |
| Propylene Glycol | 18.5 | 14 | 14 | 5 | 15 | 15 | 14 | 14 |
| Hexylene Glycol | 2 | 2 | 2 | 2 | 2 | 2 | 2 | 2 |
| Di-propylene Glycol |  |  |  |  |  |  |  |  |
| Glycerin | 6 | 4.1 | 4.1 | 4.1 | 4.1 | 4.1 | 4.1 | 4.1 |
| Polyglyceryl-6 Est. | 2.6 |  |  |  |  |  |  |  |
| Polyglyceryl-3 Cap. |  | 20 | 15 | 23 | 8 | 8 | 7.95 | 7.95 |
| Polyglyceryl-2 Cap. | 18.5 | 13 | 13 | 24 | 21 | 21.5 | 25 | 26 |
| Cola Lipid C | 4 | 4 | 4 | 4 | 4 | 4 | 4.5 | 4.5 |
| Cola Lipid SAFL | 2 | 2 | 2 | 2 | 2 | 2 | 2 | 2 |
| Phoenamid LMEA | 3 | 3 | 3 | 3 | 3 | 3 | 3 | 3 |
| Stepan Mild L3 | 5 | 7 | 7 | 2 | 7 | 5 | 7 | 7 |
| Nino CAA | 3 | 3 | 3 | 3 | 3 | 3 | 2 | 0 |
| Additives | 4.6 | 4.6 | 4.6 | 4.6 | 3.6 | 4.4 | 3.7 | 3.6 |

TABLE 3

Comparative hygiene product compositions 1-5

| Component | Comp. Ex. 1 Wt. % | Comp. Ex. 2 Wt. % | Comp. Ex. 3 Wt. % | Comp. Ex. 4 Wt. % | Comp. Ex. 5 Wt. % |
| --- | --- | --- | --- | --- | --- |
| Hostapon SCI-85 P | 13 | 13 | 13 | 13 | 13 |
| Chembetaine CAS | 5.8 | 5 | 9.6 | 5 | 6 |
| Glucotain Plus | 11 | 11 | 10 | 11 | 11 |
| Alpha Step PC-48 | | | | | |
| Alkyl Polyglucoside | | | | | |
| Butylene Glycol | 25 | 10 | 25 | 0 | 25 |
| Propylene Glycol | 0 | 9 | 2.4 | 18 | 0 |
| Hexylene Glycol | 2 | 2 | 2 | 2 | 2 |
| Di-propylene Glycol | | | | | |
| Glycerin | | | | | |
| Polyglyceryl-6 Est. | | | | | |
| Polyglyceryl-3 Cap. | | | | | |
| Polyglyceryl-2 Cap. | | | | | |
| Cola Lipid C | 5 | 7 | 0 | 6.5 | 5 |
| Cola Lipid SAFL | 5 | 7 | 0 | 6.5 | 3.2 |
| Phoenamid LMEA | 11 | 11 | 11 | 11 | 11 |
| Stepan Mild L3 | | | | | |
| Nino CAA | | | | | |
| Additives | 19.1 | 21.5 | 23.5 | 23.5 | 20.5 |

The components of each of Examples 1-12 and Comparative Examples 1-5 were mixed to form hygiene products, respectively. The hygiene products were then packaged to form hygiene product pods as described herein. In particular, the hygiene products were encapsulated in a chamber formed between sheets of PVOH using a roll coater and a sealing device.

Figure 5A:
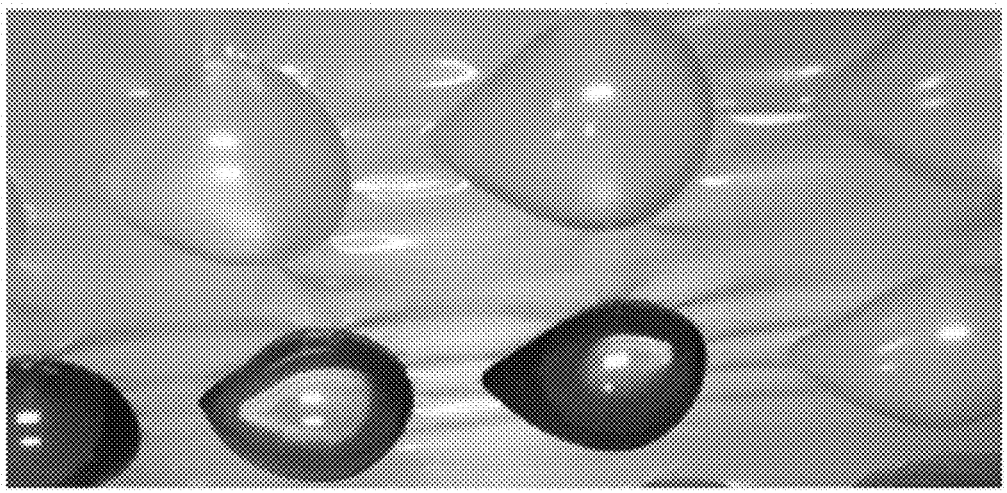
FIG. 5A shows a photograph of a plurality of hygiene product pods comprising a hygiene product sealed therein, in accordance with embodiments.
Figure 5B:
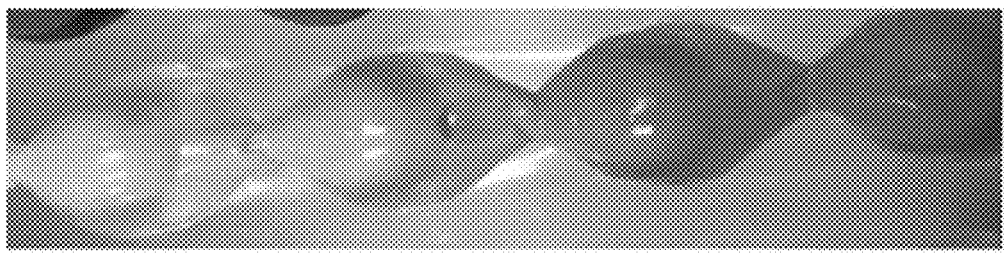
FIG. 5B shows a photograph of a plurality of comparative hygiene product pods comprising a comparative hygiene product, in accordance with embodiments.

FIG. 5A shows a photograph of a sheet of hygiene product pods formed by the deposition and sealing of the hygiene product formulated according to Example 1 between two sheets of PVOH. FIG. 5B shows photograph of a sheet of comparative hygiene product pods formed by depositing and sealing of a comparative hygiene product composition formulated according to Comparative Example 1 between two sheets of PVOH.

As shown in FIG. 5A, the hygiene product of Example 1 had a relatively low viscosity that allowed for the formation of discrete deposits of the hygiene product on the underlying PVOH sheet. As such, the deposits could be discretely sealed and the sheet could be easily cut to form individual hygiene product pods. Similar results were obtained for Examples 2-12.

The compositions of Examples 1-3 included relatively high amounts of the liquid amides dimethyl lauramide/myristamide (Ninol CAA) and surfactant lauryl lactyl lactate (Stephan Mild L3). The addition of these agents, combined with the removal of gelling agents, lowered the viscosity of the formulation. In particular, there was a gradual and slight improvement with regards to viscosity and thinning consistency as the total amounts of Ninol CAA and Stepan Mild 3 were increased from 22.7 wt % to 26 wt %. Unfortunately, there was a corresponding drop in foaming action and cleansing with the increase in liquid amides.

Example 3 included a polyglyceryl fatty acid ester (polyglyceryl-2 caprate) and a corresponding reduction in surfactant content. As a result, Example 3 exhibited a substantial reduction in foaming as compared to Examples 1 and 2.

Examples 4-8 were compositions that included a combination of two polyglyceryl fatty acid esters (polyglyceryl-2 caprate and polyglyceryl-6 esters) and reduced amounts of liquid amides. In particular, higher amounts of polyglyceryl-2 caprate were found to reduce viscosity of the compositions without significantly reducing foaming and cleansing performance. As such, polyglyceryl-2 caprate was shown to provide functions similar to water used in conventional shampoo. The addition of polyglyceryl-2 caprate was also found to allow the drastic reduction in the amounts of Ninol CAA and Stepan Mild L3, which were thought to be limiting with respect to foam height and cleansing ability.

Examples 9-15 were compositions that included combinations of polyglyceryl-2 caprate and polyglyceryl-3 caprate, with the polyglyceryl-3 caprate being used in place of the polyglyceryl-6 esters of Examples 4-8. In particular, Examples 9-15 included varying amounts of both SCI powder and polyglyceryl-3 caprate, in order to maximize foam height while maintaining a thin viscosity that is rapidly self-leveling. Examples 9-15 demonstrated that amounts of SCI powder ranging from about 9.5 wt % to about 10.5 wt % provided unexpectedly good foaming and viscosity characteristics. In addition, polyglyceryl-3 caprate amounts above about 8 wt % decreased foam bubble size and wall stability, which unexpectedly provided a rich milky lather that dissipated quickly and did not build.

In contrast to the exemplary hygiene product shown in FIG. 5A, the comparative hygiene product shown in FIG. 5B had a relatively high viscosity, which resulted in tailing between deposits of the comparative hygiene product. In particular, the viscosity of the comparative hygiene product caused the product to form a "tail" between the deposits of the product on the underlying PVOH sheet and the deposition apparatus. As a result, the deposits overlapped one another, and the sealing process did not produce discretely sealed deposits that could be cut into individual sealed pods. Similar results were obtained for Comparative Examples 2-5.

In particular, Comparative Examples 2-5 were formulated in an attempt to reduce the viscosity of the compositions and prevent tailing, by modifying the polyol amounts and compositions. Comparative Example 5 had the lowest viscosity. However, the sodium cocoyl isethionate was held in a gel-like suspension that was still too viscous to prevent tailing or provide self-leveling in Comparative Example 5.

Example 17—Characterization of Physical Properties

The resulting film thickness was measured using a digital handheld micrometer

Films were analyzed for various qualities as described below, such as solubility in water, morphological homogeneity, flexibility/brittleness, tensile strength, and tackiness.

Solubility in Water

The film's solubility in water was measured using a modified MSTM-205 (MonoSol's standard test method for solubility). Water temperature was adjusted to 78-80° F. and tap water was used instead of distilled water.

Homogeneity

Resulting film homogeneity was assessed qualitatively by:

A) Visual Inspection: Ensuring that film appeared uniform in macroscopic visual qualities. Observing such film under optical microscopy to assess the morphological homogeneity.

B) Dissolve morphology: Observed how the film dissolves. A homogenous dissolve suggests film homogeneity, whereas a segmented dissolve suggests an immiscible system.

C) Tear morphology: Stretching a film until it tears. If the tear is linear & uniform, this suggests the resin is homogeneous.

Mechanical Properties

The mechanical properties of a film may be characterized using a TA.XT plus C Texture Analyzer. Reported properties include: tensile strength, elongation at break, young's modulus, and initial stiffness.

Tackiness

Tackiness was measured qualitatively. Tackiness can be adjusted with addition of anti-tacking agents such as magnesium stearate, silica, talc, etc.

Examples 24-27—Hygiene Product Formulations

The components of each of the each of Examples 24-27 shown in Tables 7-10 below were mixed to form hygiene products, respectively. Where ranges are given in Tables 7-9, multiple batches were tested with varying amounts of the listed component within the cited range. The batches made in Example 24 were shampoo hygiene products. The batches made in Example 25 were conditioner hygiene products. The batches made in Example 26 were bodywash hygiene products. The batch made in Example 27 was a lotion hygiene product. In many cases, the components were mixed together in phases, each phase varying in mixing speed, temperature, etc. in order to obtain the hygiene product of interest.

TABLE 7

Example 24 shampoo formulations

| INCI | wt % Range |
| --- | --- |
| Propylene Glycol | 11-20% |
| Butylene Glycol | 0-3% |
| Glucotain Plus | 5-17% |
| Glycerin | 2-4% |
| Stepan Mild L3 | 5-7.5% |
| Hexylene Glycol | 0-2% |
| Polyquaterium-10 | 0-0.75% |
| Chembetaine CAS | 2-3% |
| ColaLipid C | 3.3-4.5% |
| ColaLipid SAFL | 2-2.5% |
| AminoSensyl HC | 0.48-1.35% |
| Alpha Step PC-48 | 3.5% |
| Sodium Cocoyl Isethionate | 0-7% |
| Sodium Methyl Cocoyl Taurate | 0-8% |
| Phoenamid LMEA | 2.9-3% |
| Softisan ConditiHAIR | 2.4-2.5% |
| Polyox Wsr 205 | 0-0.3% |
| Polyglyercyl-2 Caprate | 27-34% |
| Polyglyceryl-3 Caprate | 0-8% |
| Softisan GC8 | 1.45-1.5% |
| Glucoside 70% | 1.5-4% |
| Polyglyceryl 6 Esters (SF) | 0-1.15% |
| Caprylyl Pyrrollidone | 0-2% |
| Lauryl Pyrrolidone | 0-2% |
| Panthenol | 0-1% |
| Argan Oil | 0-0.5% |
| Tocopherol | 0-1% |
| DL-Panthenol | 0-1% |
| Gotas De Color | 1% |
| Extract Blend | 0.3% |

TABLE 8

Example 25 conditioner formulations

| INCI | Wt % Range |
| --- | --- |
| Propylene Glycol | 14.5-15.5% |
| Glucotain Plus | 3-4% |
| Glycerin | 2-4% |
| Stepan Mild L3 | 1-6% |
| Polyquaterium-10 | 2% |
| Aminosensyl HC | 0-1.25% |
| Sodium Methyl Cocoyl Taurate | 2% |
| Sodium Methyl Oleoyl Taurate | 0-4% |
| Phoenamid LMEA | 5% |
| Softisan ConditiHAIR | 5% |
| Polyox WSR 205 | 0.2-0.4% |
| Polyglyceryl-3 Caprate | 0-30% |
| Polyglyceryl-2 Caprate | 0-27.5% |
| Sunflower Solubilizer | 3% |
| Zenicone IX | 4-5% |
| Ceteareth-20 | 9-10% |
| Conditioner SD | 4-5% |
| Cetearyl Alcohol | 5-7% |
| Tocopherol | 0.1% |
| Argan Oil | 0.25-1% |
| Gotas de Color | 1% |

TABLE 9

Example 26 bodywash formulations

| INCI | Wt % Range |
| --- | --- |
| Glucotain Plus | 9-10% |
| Propylene Glycol | 15-20% |
| Glycerine | 2-4% |
| Stepan Mild L3 | 0-5% |
| Polyquaterium-10 | 0-0.3% |
| Chembetaine CAS | 0-2% |
| ColaLipid C | 0-3.5% |
| ColaLipid SAFL | 2.5-5% |
| AminoSensyl HC | 0-1.25% |
| Alpha Step PC-48 | 0-4% |
| Sodium Methyl Cocoyl Taurate | 7-8% |
| Phoenamid LMEA | 0-5% |
| Softisan ConditiHAIR | 0-2.5% |
| Polyox Wsr 205 | 0-0.25% |
| Polyglyercyl-2 Caprate | 37-48% |
| Softisan GC8 | 0-1.5% |
| Glucoside 70% | 0.975-3% |
| Polyglyceryl 6 Esters (SF) | 0-1.25% |
| Extract Blend | 1% |
| Aloe Symrise Fragrance | 0.3-0.5% |

Seventeen shampoo formulations were prepared and optimized to increase foam height and stability, while minimizing phase seperation. Stable formulations were prepared using the components recited in Table 7. One exemplary shampoo formulation had a pH of 6.37 and a water activity of 0.583 aw.

Four conditioner formulations were prepared and optimized to increase conditioning while minimizing phase seperation. Stable formulations were prepared using the components recited in Table 8.

Three bodywash formulations were prepared and optimized to improve spreadability and performance while mimizing phase seperation. Stable formulations were prepared using the components recited in Table 9. Viscosity of an exemplary lotion formulation was 650 mpa.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A hygiene product pod, comprising:
a water-soluble envelope; and
a hygiene product sealed in the water-soluble envelope, the hygiene product comprising, based on the total weight of the hygiene product:
a non-aqueous carrier comprising:
one or more polyol solvents in an amount ranging from about 10 wt % to about 30 wt %; and
one or more polyglyceryl fatty acid ester (PGE) chassis in an amount ranging from about 10 wt % to about 50 wt %,
wherein the hygiene product has a free water content of about 18 wt % or less.

2. The hygiene product pod of claim 1, wherein the hygiene product is an emulsified liquid or gel.

3. The hygiene product pod of claim 1, wherein the hygiene product is a liquid.

4. The hygiene product pod of claim 1, wherein the hygiene product comprises, based on the total weight of the hygiene product, one or more surfactants in an amount ranging from about 10 wt % to about 40 wt %.

5. The hygiene product pod of claim 4, wherein the one or more surfactants are selected from non-ionic surfactants, anionic surfactants, amphoteric surfactants, cationic surfactants, or a combination thereof.

6. The hygiene product pod of claim 1, wherein the hygiene product comprises, based on the total weight of the hygiene product, the one or more polyol solvents in an amount ranging from about 15 wt % to about 25 wt %.

7. The hygiene product pod of claim 1, wherein the hygiene product further comprises a fragrance oil.

8. The hygiene product pod of claim 1, wherein the hygiene product further comprises a pyrrolidone compound in an amount ranging from about 0.5 wt % to about 10 wt %.

9. The hygiene product pod of claim 8, wherein the pyrrolidone compound is lauryl pyrrolidone.

10. The hygiene product pod of claim 8, wherein the pyrrolidone compound is caprylyl pyrrolidone.

11. The hygiene product pod of claim 1, wherein the one or more PGE chassis have a hydrophilic-lipophilic balance (HLB) value of at least 9.

12. The hygiene product pod of claim 1, wherein the one or more PGE chassis comprise, based on the total weight of the hygiene product:
polyglyceryl-6 esters in an amount ranging from about 0.5 wt % to about 11 wt %; and
polyglyceryl-2 caprate in an amount ranging from about 5 wt % to about 35 wt %.

13. The hygiene product pod of claim 1, wherein the one or more PGE chassis comprise, based on the total weight of the hygiene product:
polyglyceryl-2 caprate in an amount ranging from about 10 wt % to about 50 wt %.

14. The hygiene product pod of claim 1, wherein the non-aqueous carrier comprises, based on the total weight of the hygiene product, the phospholipids in an amount ranging from about 1 wt % to about 15 wt %, wherein the phospholipids comprise cocamidopropyl PG-dimonium chloride phosphate and linoleamidopropyl PG-dimonium chloride phosphate.

15. The hygiene product pod of claim 1, wherein the water-soluble envelope comprises polyvinyl alcohol (PVOH) or hydroxypropyl methylcellulose (HPMC).

16. The hygiene product pod of claim 1, wherein the water-soluble envelope has a thickness ranging from about 0.5 mil to about 10 mil, where a mil is equal to a thousandth of an inch.

17. The hygiene product pod of claim 1, wherein the free water content is from about 1% to about 12.5%.

18. The hygiene product pod of claim 1, wherein the hygiene product has a water activity of 0.70 aw or less.

19. The hygiene product pod of claim 1, wherein the hygiene product is a shampoo, a conditioner, a body wash, a shaving cream, a lotion, or a combination thereof.

20. The hygiene product pod of claim 1, wherein the one or more polyol solvents comprises propylene glycol in an amount of from about 10 wt % to about 20 wt %, based on the total weight of the hygiene product.

* * * * *